A. B. KNOTTS.
CANE HARVESTING MACHINE.
APPLICATION FILED JUNE 26, 1918.
1,295,331.
Patented Feb. 25, 1919.
14 SHEETS—SHEET 14.
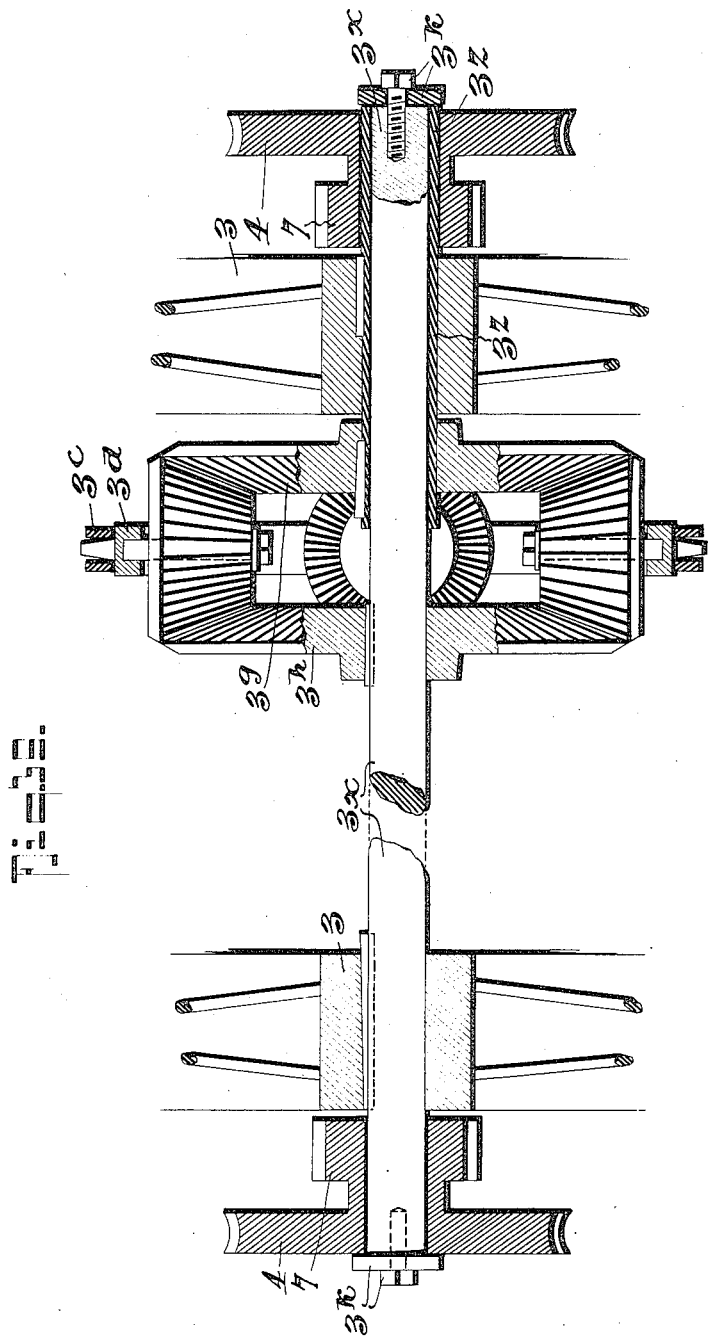
INVENTOR
A. B. Knotts
BY
Fred. G. Dietrich
ATTORNEYS

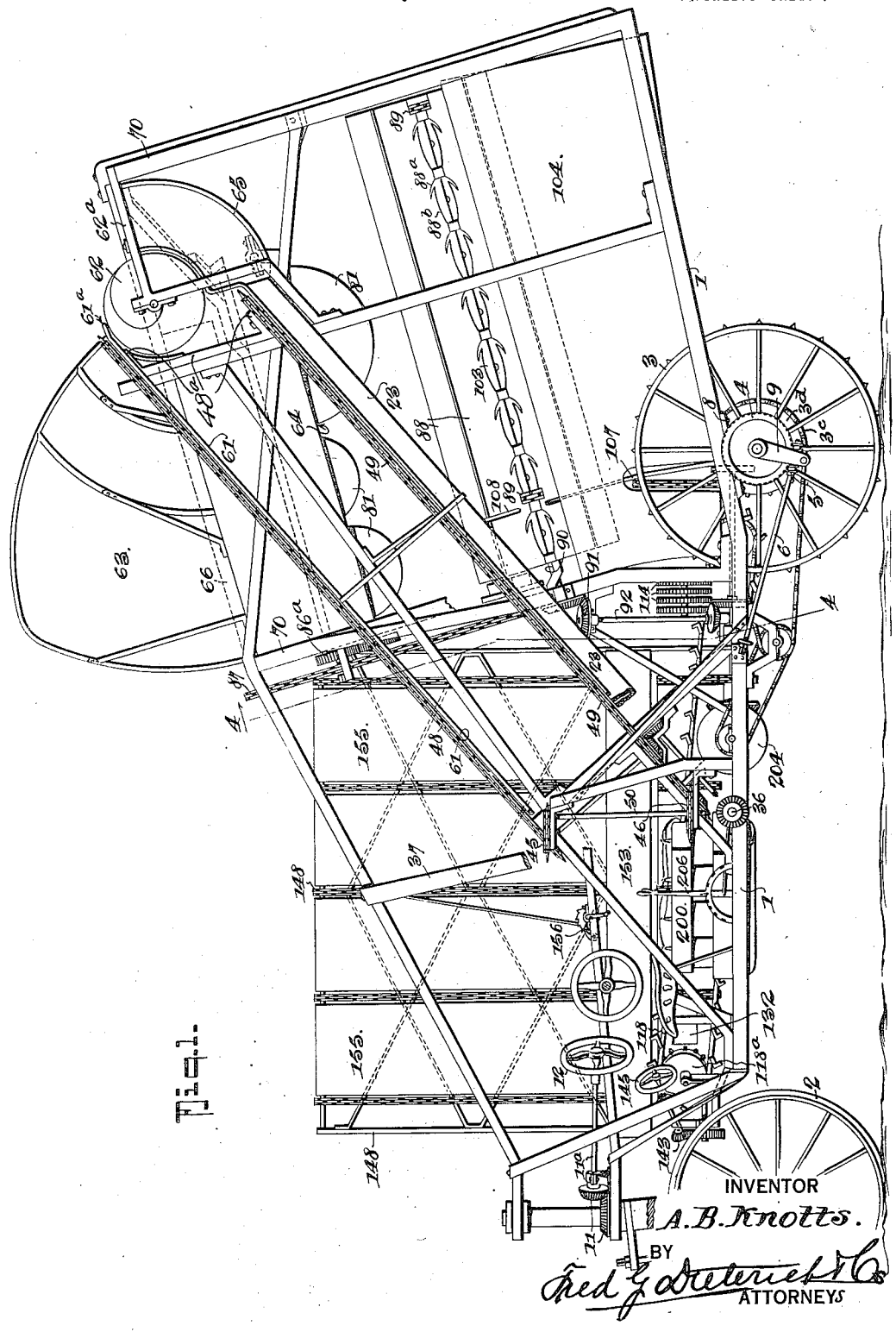

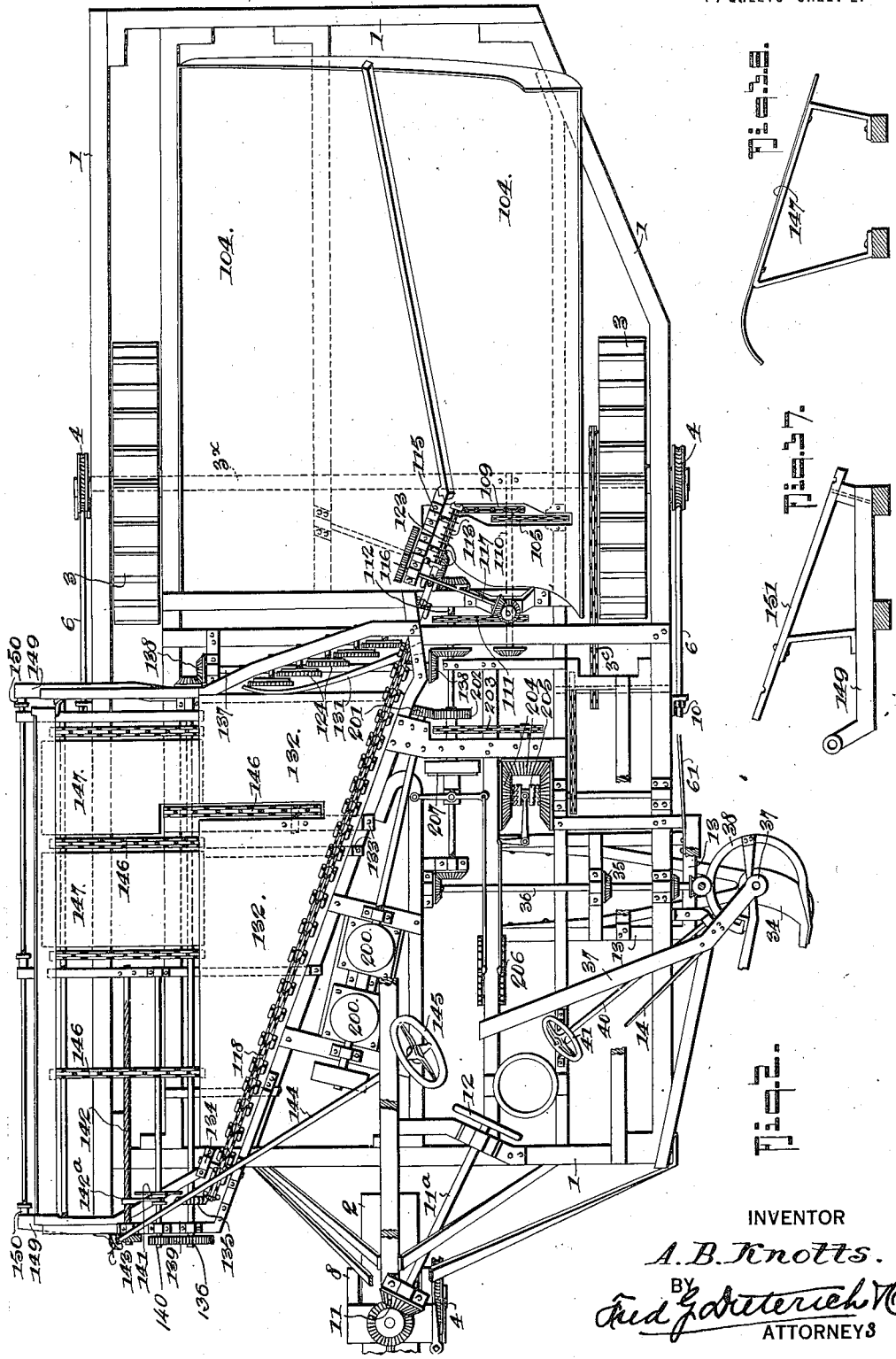

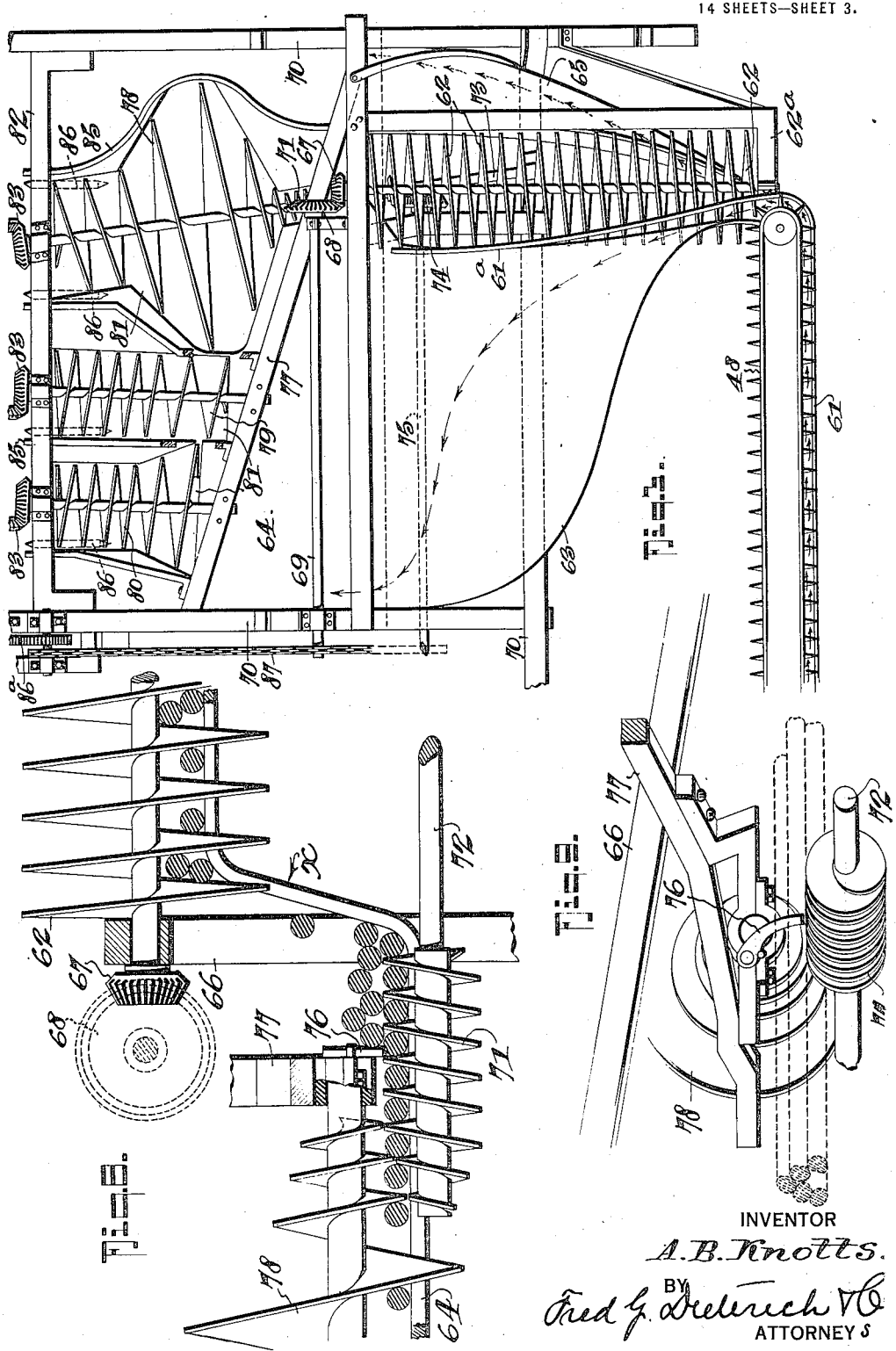

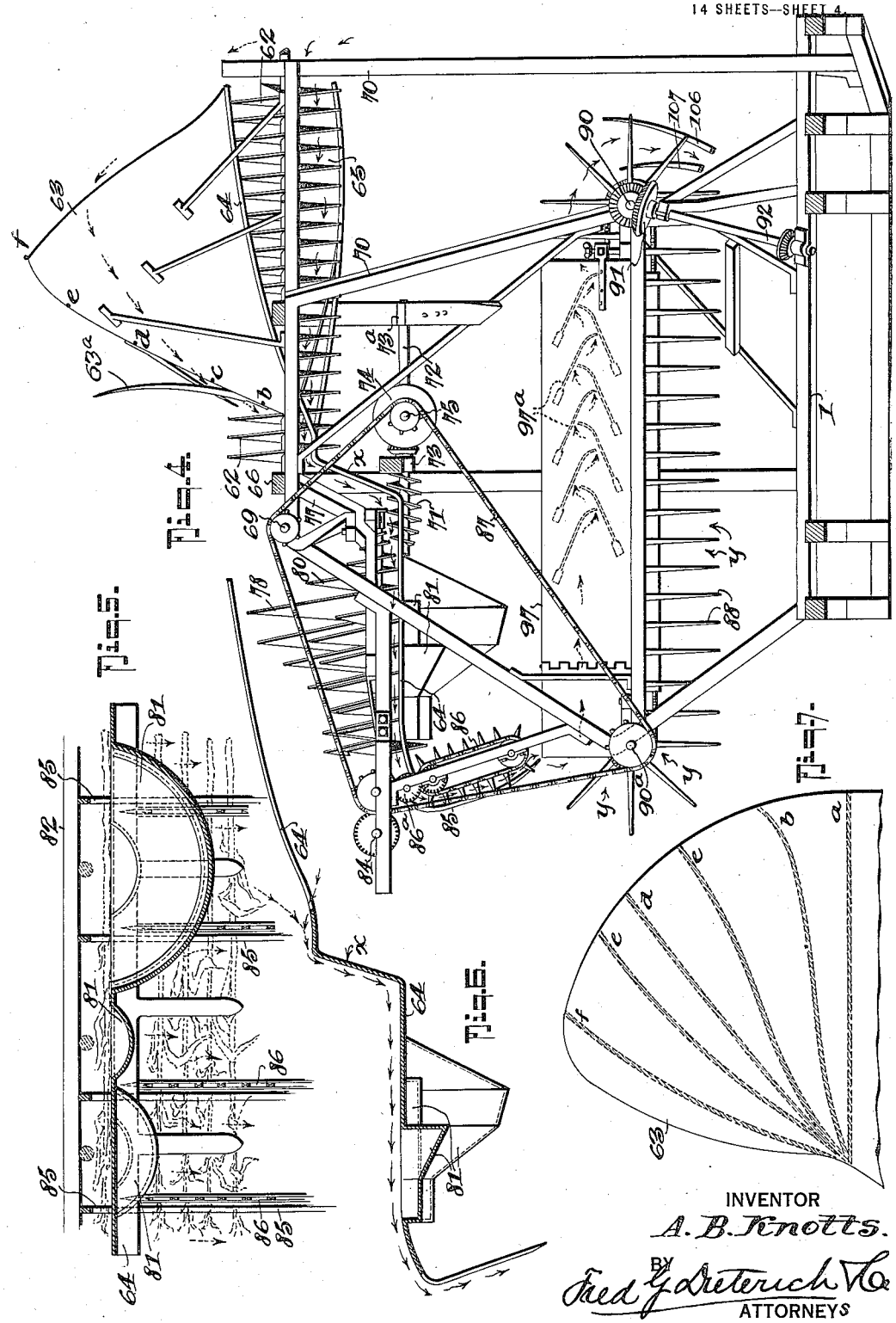

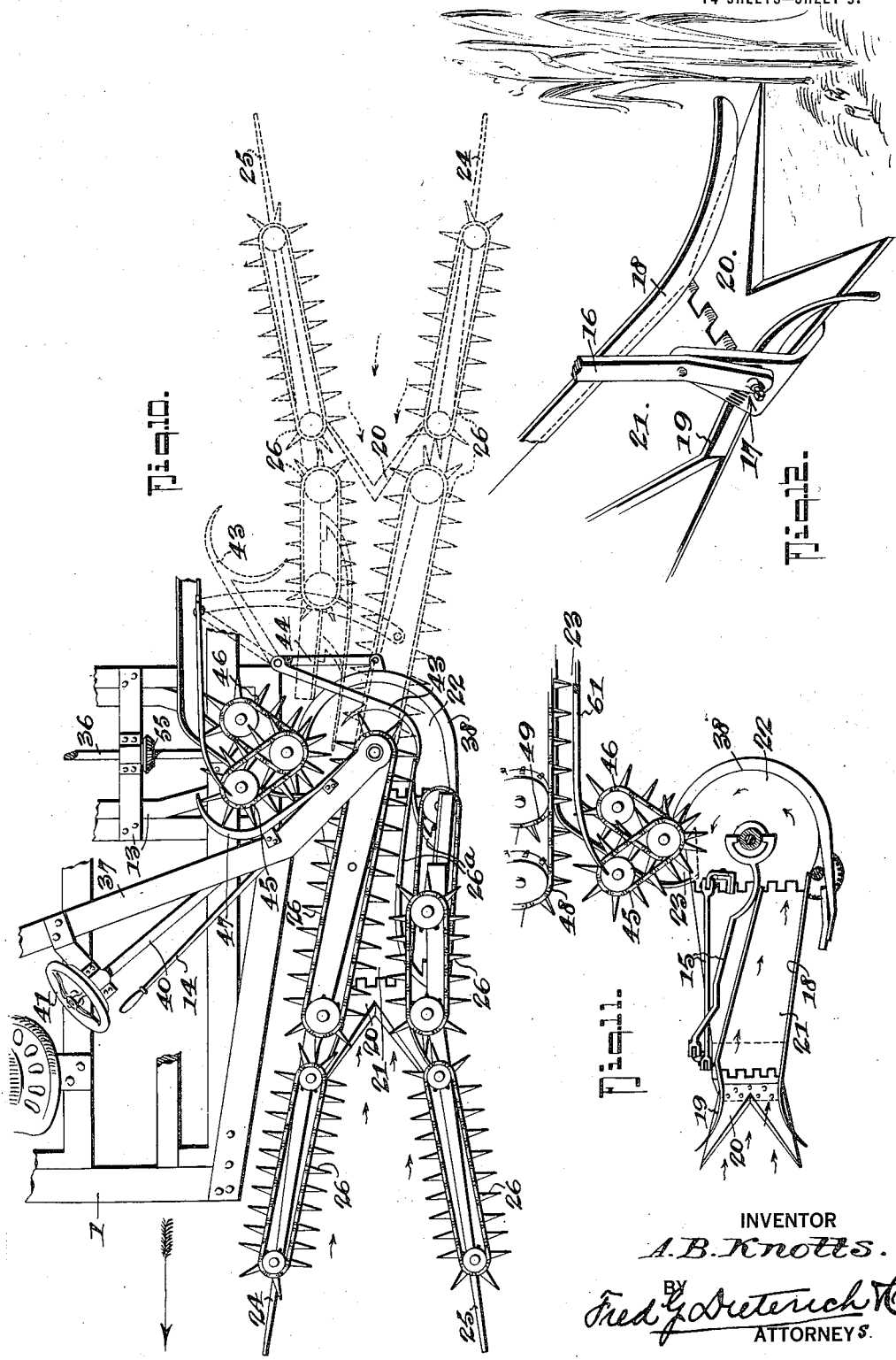

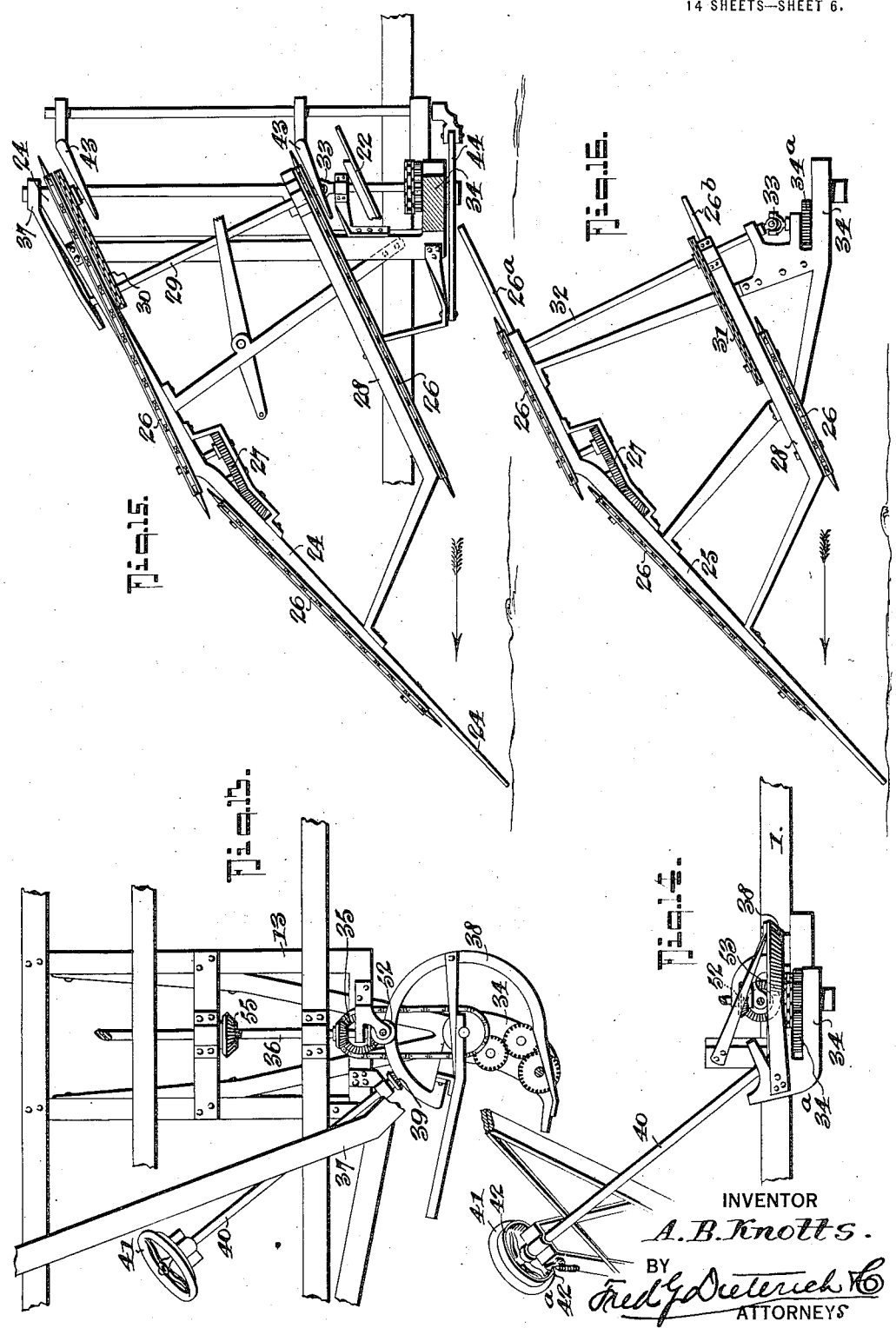

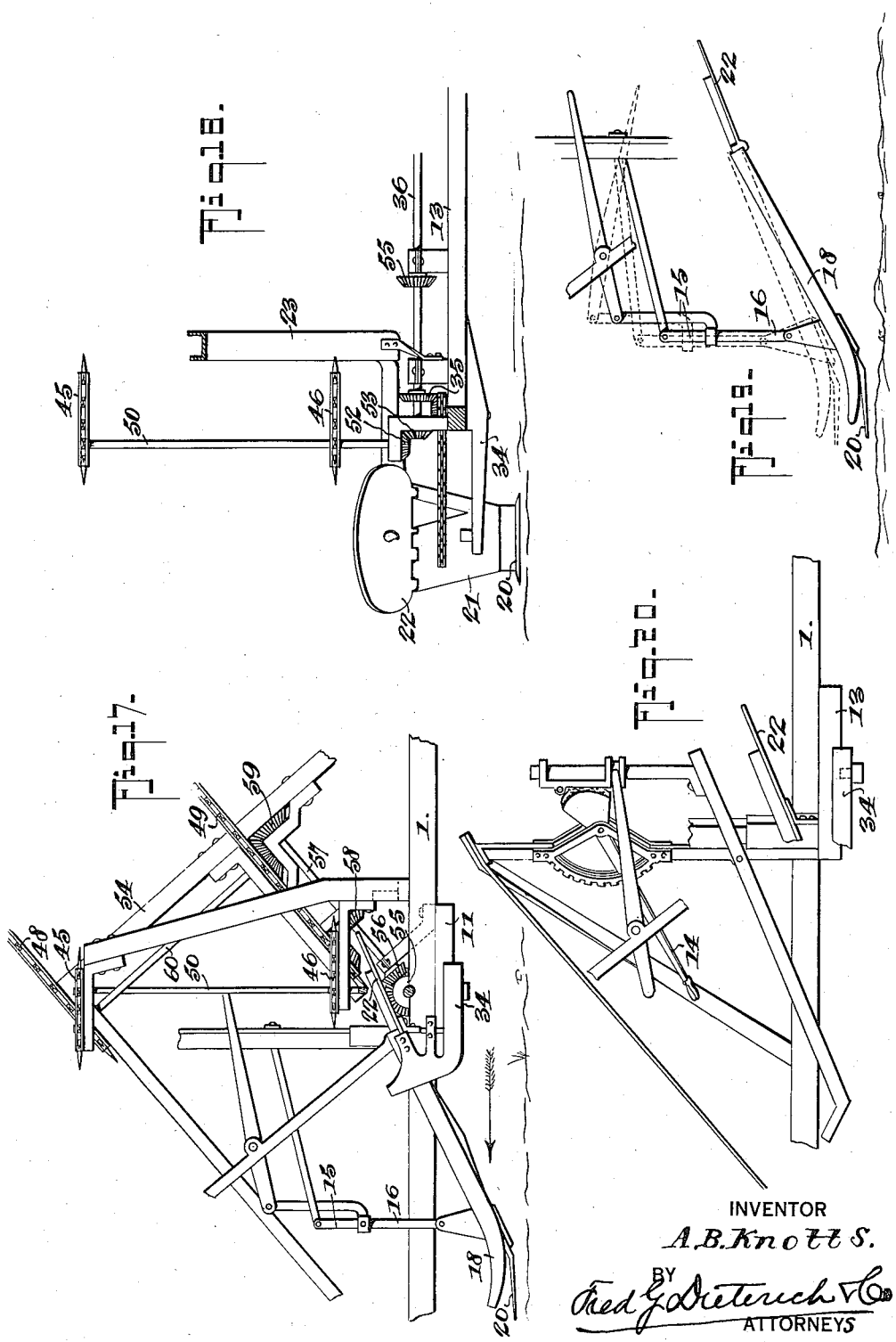

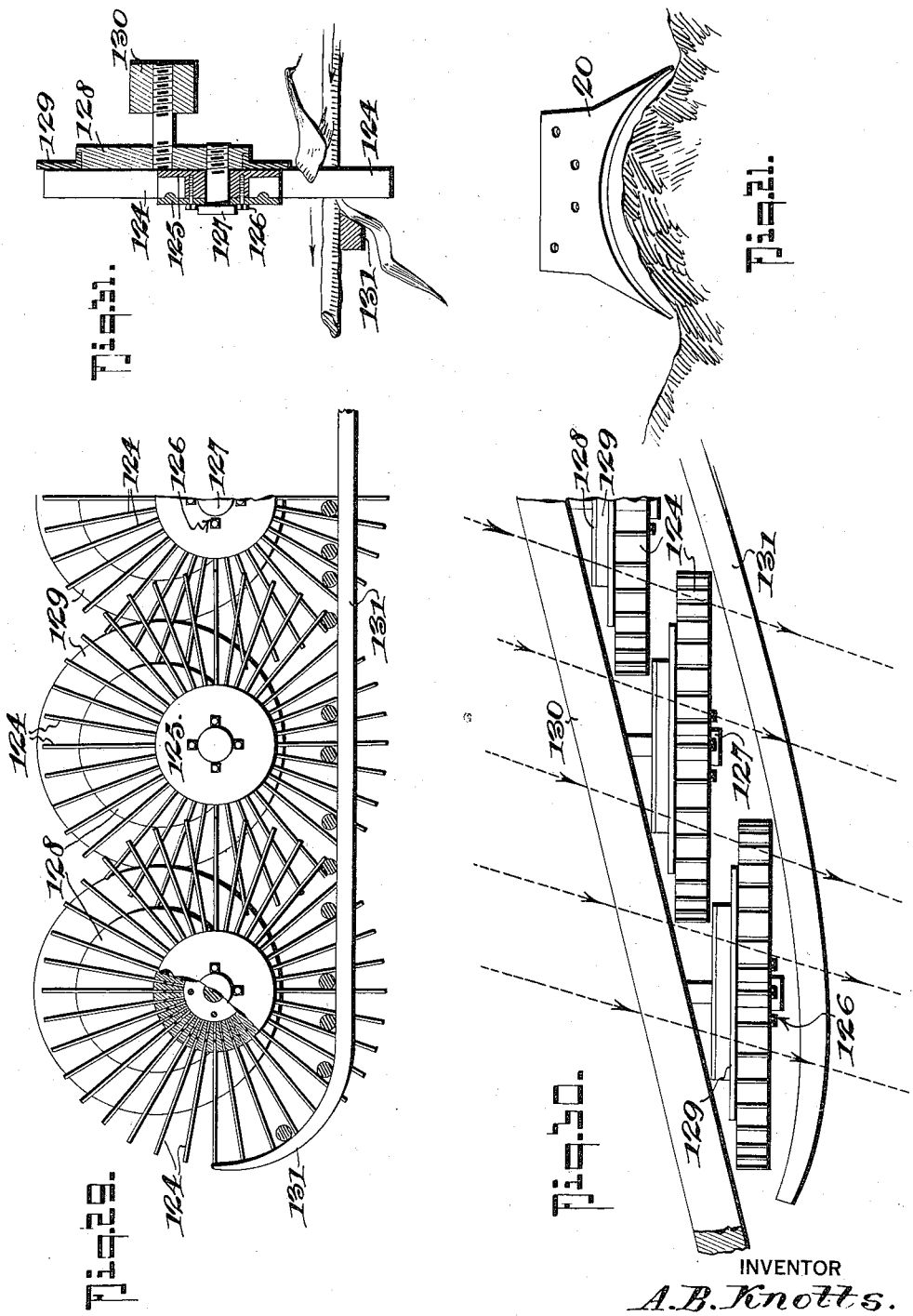

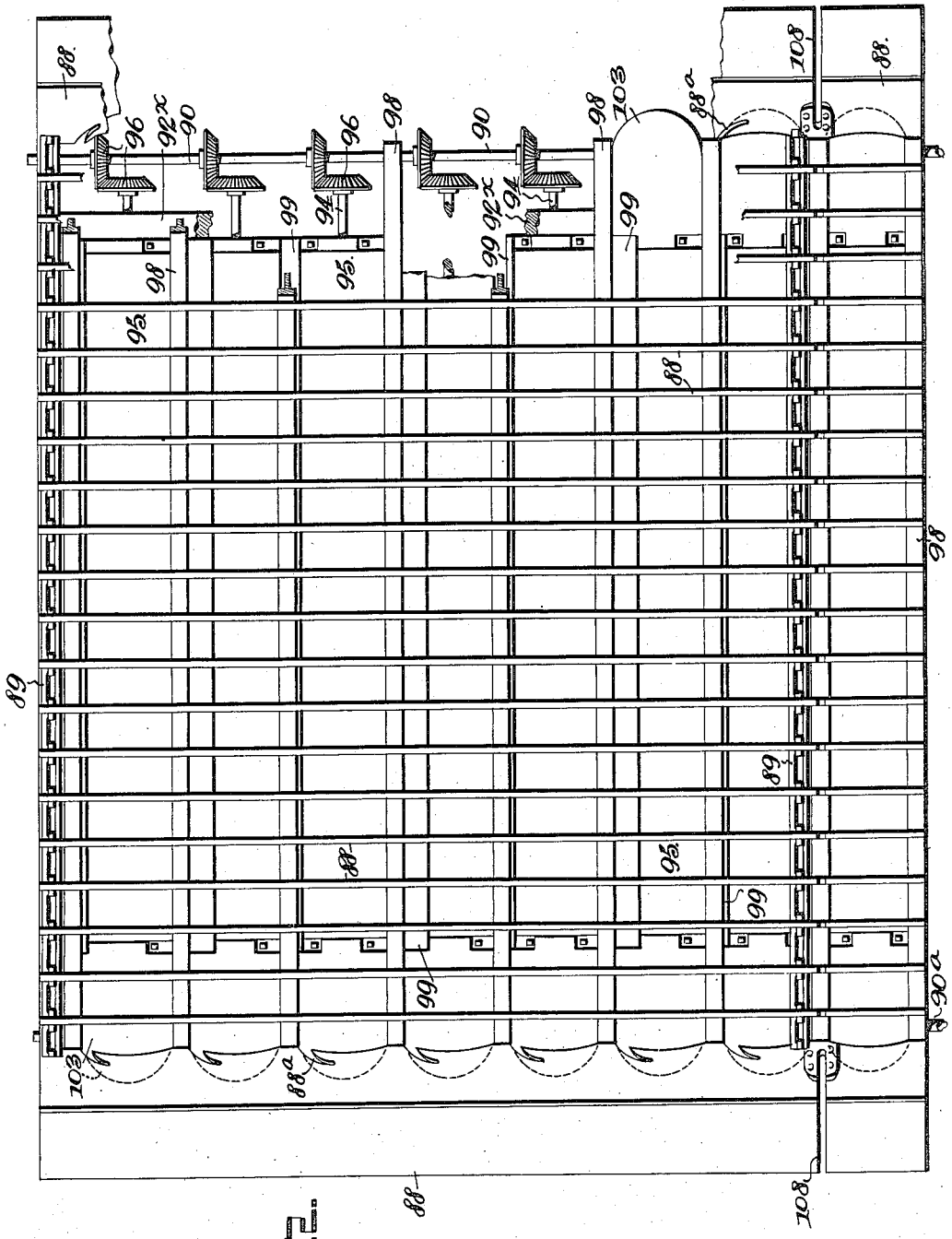

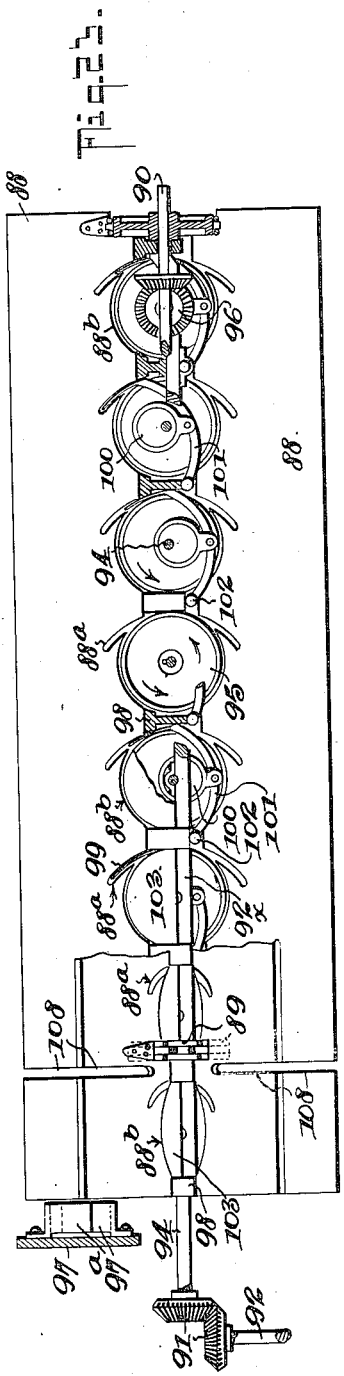
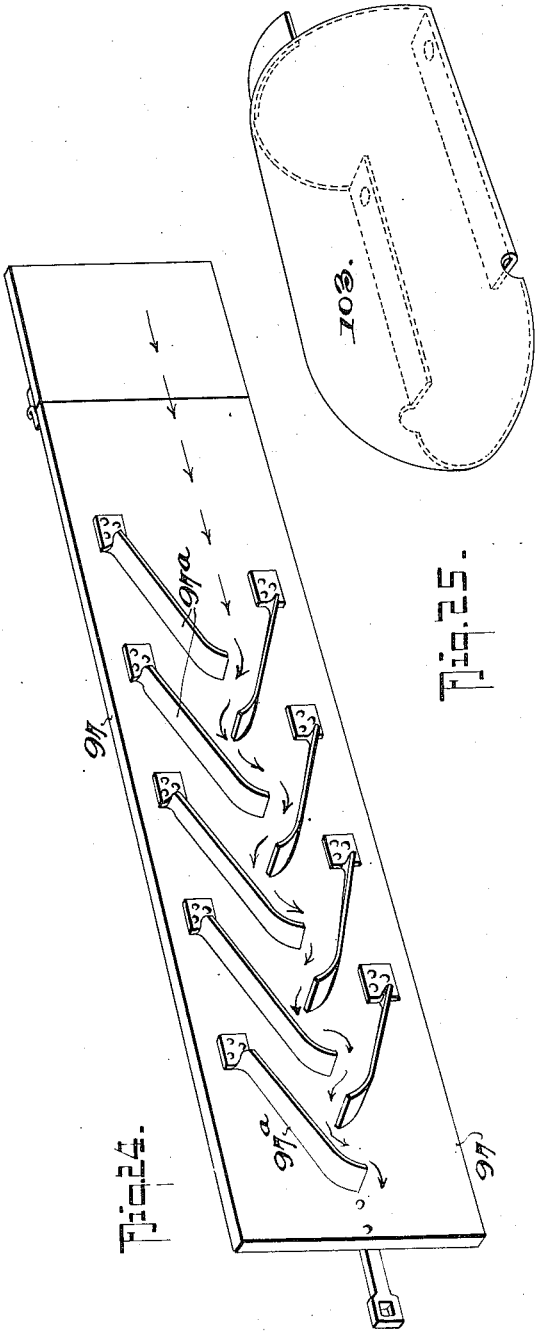

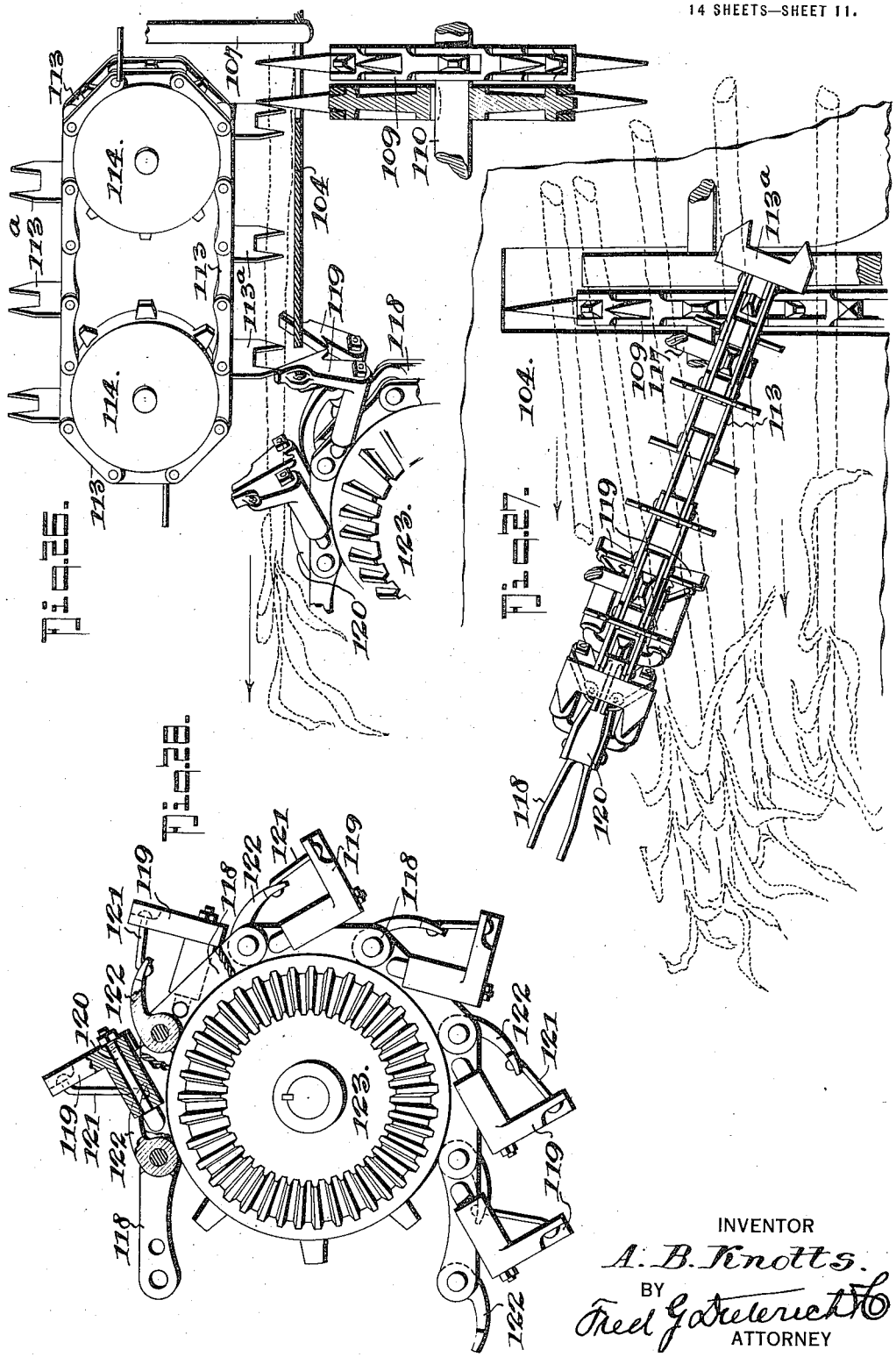

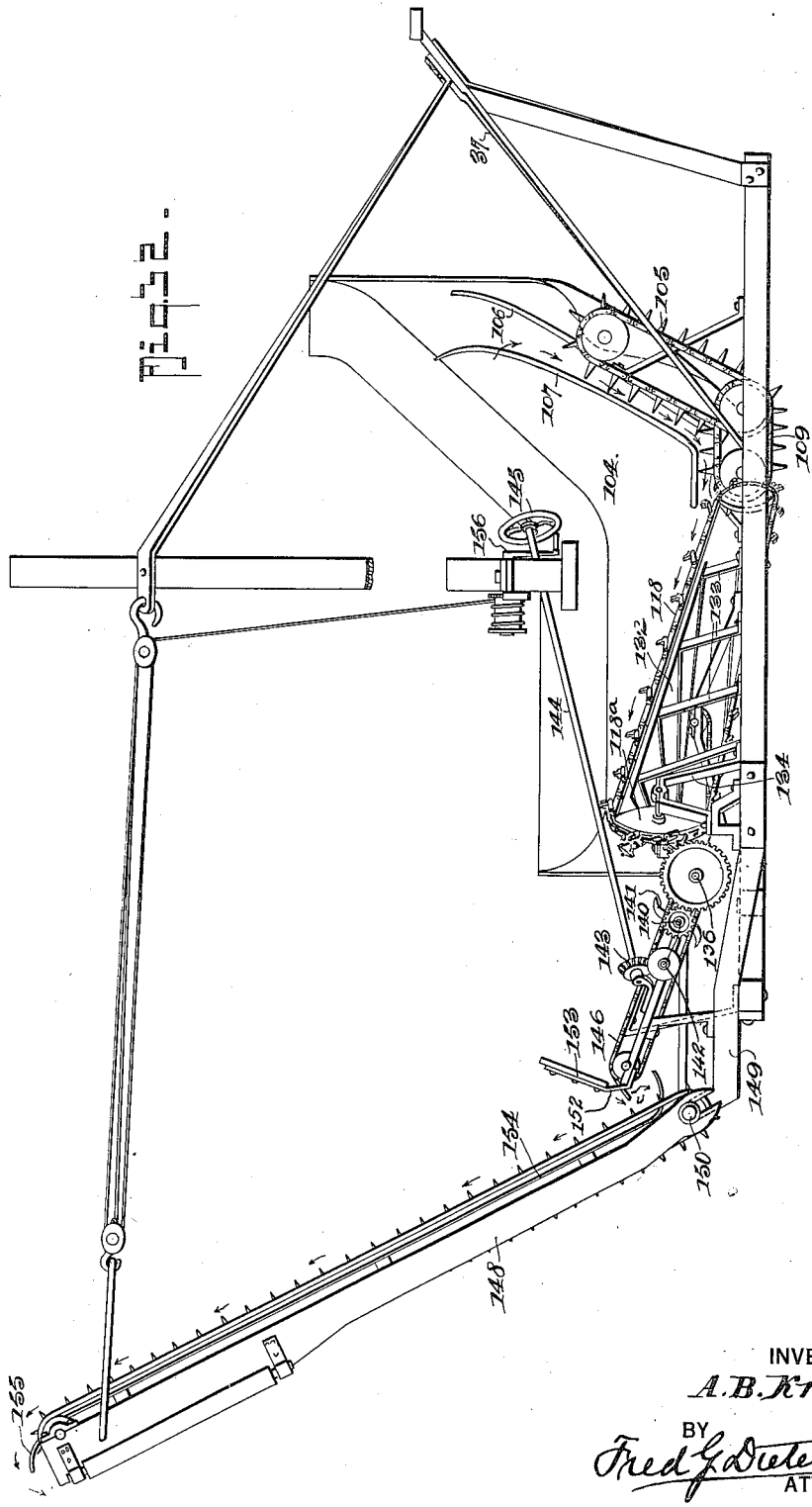

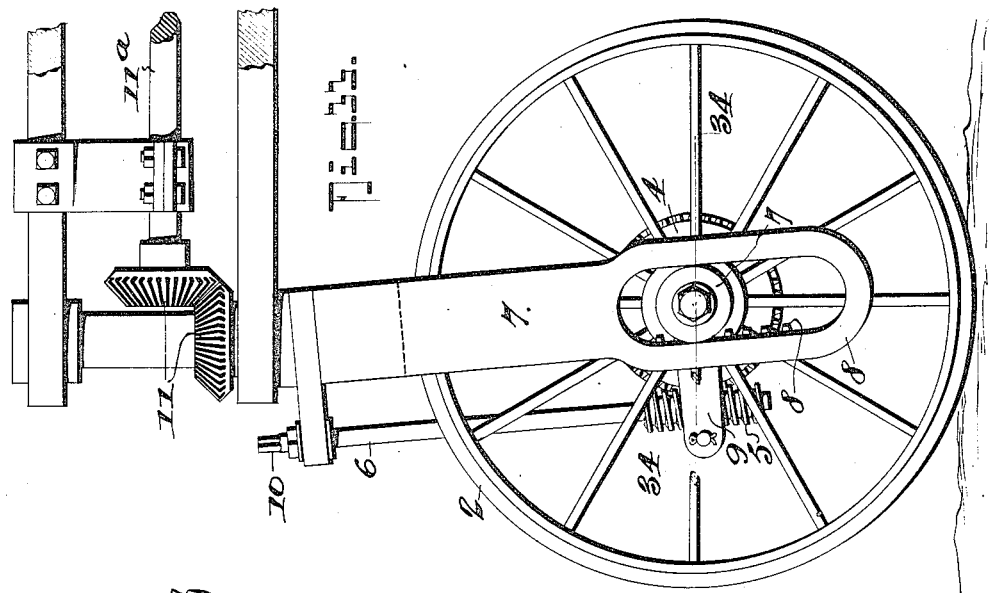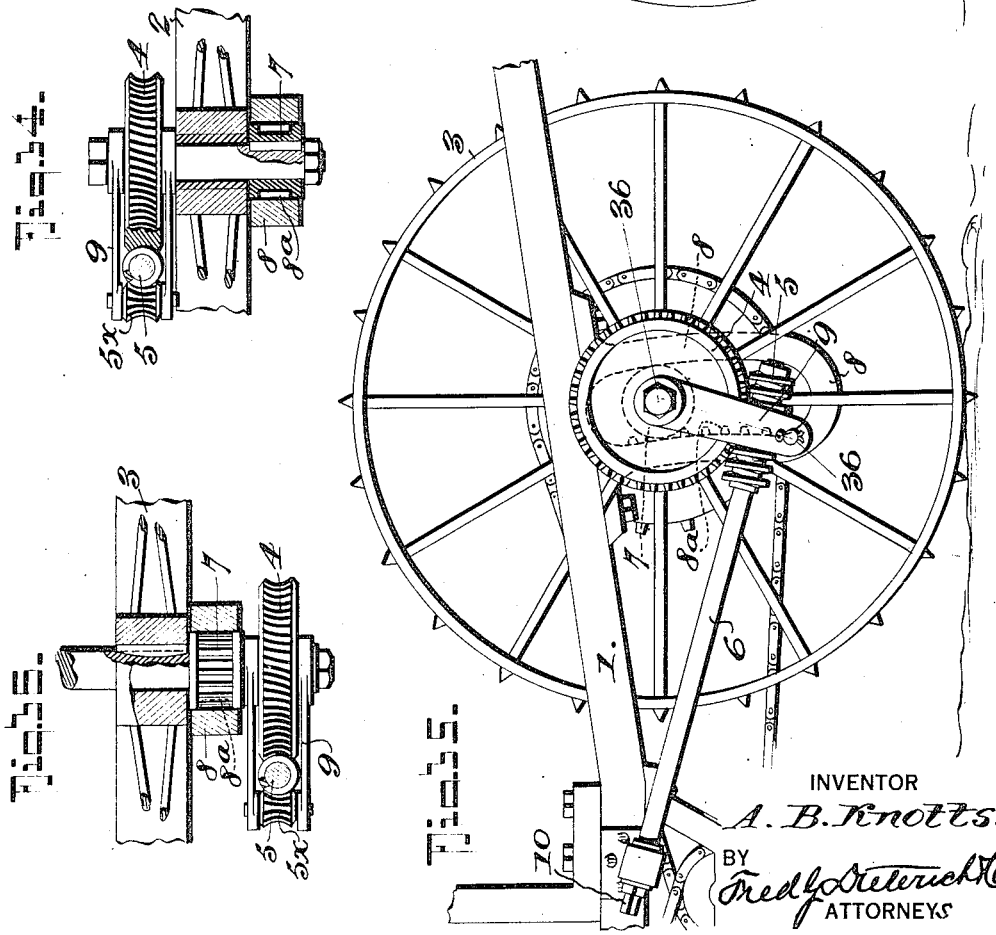

UNITED STATES PATENT OFFICE.

ADDISON BURGESS KNOTTS, OF RAMOS, LOUISIANA.

CANE-HARVESTING MACHINE.

1,295,331.  Specification of Letters Patent.  Patented Feb. 25, 1919.

Application filed June 26, 1918. Serial No. 241,979.

*To all whom it may concern:*

Be it known that I, ADDISON B. KNOTTS, residing at Ramos, in the parish of St. Mary and State of Louisiana, have invented a new and Improved Cane-Harvesting Machine, of which the following is a specification.

This invention relates to an improved construction of cane harvesting machine and which provides means whereby the machine may be advanced backward and forward along the rows of cane without the necessity of turning the machine from its straight course other than that made necessary to follow the row of cane being cut. The invention also provides a vertically adjustable cane cutting means, guide rods and feed-in mechanism to bring the stalks into position to be cut and it furthermore provides means for conveying the cut stalks through the different stages of operation separately.

The invention further has for its object to provide means for stripping the cane as it passes through the machine and for topping the stalks during their travel through the machine.

The invention also includes those novel details of construction, combination and arrangement of parts, all of which will be first fully explained, then be specifically pointed out in the appended claims and illustrated in the accompanying drawings, in which:

Figure 1 is a side elevation of my cane harvester machine, the reversible cutting mechanism being omitted.

Fig. 2 is a plan view of the same, the upper frame structure and the cane stalk conveying mechanism supported thereby, being omitted to better illustrate the lower structure of the harvester.

Fig. 3 is a plan view of the main portion of the upper frame structure, the cane guide platform and the various conveyer devices by which the cane stalks are brought from the cutters through the separator conveyers, the arrows indicating the manner in which the position of the cane stalks is changed from the vertical, in which they are cut, to the horizontal, when they are dropped to the separators.

Fig. 4 is a detail section taken substantially on the line 4—4 of Fig. 1.

Fig. 5 is a detail section across the conveyer platform, the conveyer incasements and the conveyer shafts, to illustrate the manner in which the cane stalks are carried in their separated position down to the head-evening-mechanism.

Fig. 6 is a detail longitudinal section of the conveyer platform, the arrows indicating the travel of the cane stalks.

Fig. 7 is a diagrammatic view of the concaved portion of the conveyer platform, the same forming a rest for the cane stalks during their change from the vertical to the horizontal position; the dotted lines indicating the cross sectional shape of the platform at the various points $a$, $b$, $c$, $d$, $e$ and $f$.

Fig. 8 is a detail section of the main cane separating conveyer and illustrates the manner in which the cane stalks are held up or retarded so as to allow but one stalk to pass to the several separator conveyers at a time.

Fig. 9 is a detail perspective view of the cane stop devices.

Fig. 10 is a detail plan view of the reversible cane cutting mechanism, its adjacent framing and braces, the complete adjusting lever and the hand wheel for effecting the reversal of the cutting elements also being shown; the reversed position of the cutting elements is indicated in dotted lines.

Fig. 11 is a detail plan view of the cutter blade and the coöperating cane conveying chute and conveyer chains.

Fig. 12 is a detail perspective view of the lower adjustable portion of the cutter blade.

Fig. 13 is a plan view of that portion of the machine where the cutting elements are attached, illustrating the manner in which the gear segment is hand operated to effect the reversing of the cutting devices and also the manner in which power is derived for driving the cane stalk feed-in chains.

Fig. 14 is a side elevation of the parts shown in Fig. 13.

Fig. 15 is a detail elevation and part section of the inner or machine side of the cane stalk guide and feed-in chains, a portion of the cutter platform also being shown.

Fig. 16 is an elevation of the mechanism which opposes and coöperates with the parts shown in Fig. 15.

Fig. 17 is a fragmentary view of the cutter blade and platform and the adjacent mechanism, part of the same being omitted to better illustrate the manner in which power is applied to the conveyer chains.

Fig. 18 is a rear view of the cutter blade and platform, the cane conveyer chute and adjacent mechanism being also shown.

Fig. 19 is a diagrammatic view of the cutter and its coöperating toggle connections.

Fig. 20 is a detail view of the mechanism by which the raising and lowering of the cutter blade is effected from the driver's seat.

Fig. 21 is a detailed view of a modified construction of cutter blade, the same being adapted for use in a ridged cultured field.

Fig. 22 is a plan view of the stalk-evening flukes which receive the cane when dropped in its separated position from the separator conveyers.

Fig. 23 is an end view and part section of the same showing its relation to the adjustable head-evening and leaf pulling board; the eccentric-operated shaker devices also being illustrated.

Fig. 24 is a detail perspective view of the adjustable head-evening and leaf pulling board.

Fig. 25 is a similar view of one of the removable eccentric covering hoods.

Fig. 26 is a detail view of the stalk engaging chain and a portion of the gripper carrying chain to which it delivers the stalks one by one to be gripped thereby and drawn through the series of leaf stripping wheels.

Fig. 27 is a plan view of the parts shown in Fig. 26.

Fig. 28 is a detail face view and part section of one end of the gripper carrying chain and the pinion driven sprocket, the manner in which the gripper jaws are opened and closed on the stalk end being clearly illustrated.

Fig. 29 is a face view and part section of several of the stripper wheels and the adjacent knife edged cane support.

Fig. 30 is a plan view of the parts shown in Fig. 29.

Fig. 31 is a vertical section through one of the stripper wheels.

Fig. 32 is a front view of parts of the machine beyond the front or steering wheel showing the lower cane receiving pan or platform, the gripper carrying chain, the head topping knife, the butt evening board and the adjustable conveyer up and over which the cane is carried and dropped onto the platform.

Fig. 33 is a detail side elevation of the front or steering wheel of the machine illustrating the manner in which the wheel is turned to effect the steering of the machine and the mechanism for adjusting the parts to effect the raising and lowering of the machine base.

Fig. 34 is a horizontal section of the same on the line 34—34 of Fig. 33.

Fig. 35 is a view similar to Fig. 33 of one of the rear or driving wheels.

Fig. 36 is a horizontal section thereof on the line 36—36 of Fig. 35.

Fig. 37 is a detail elevation of one of the off-take conveyer pivot brackets.

Fig. 38 is a similar view of one of the stalk supporting tables which delivers the cane stalks to the said conveyer.

Fig. 39 is a detail sectional view showing more fully the axle construction on which the drive wheels are mounted.

In the drawings, in which like numerals and letters of reference indicate like parts in all of the figures, 1 represents the substantially rectangular base frame upon which the mechanism and various bracings are supported. 2 indicates the front or steering wheel and 3 represents the rear or power wheels by which the machine is propelled either forwardly or backwardly along the cane furrows. To provide for raising or lowering the base frame, as conditions may require, the wheels are provided with a large worm gear 4 carried on the axles thereof (Figs. 36 and 39) and when motion is imparted to the gear wheels 4, in either direction, by the worm 5, on the lower end of the shaft 6, it will be readily seen that its coöperating flanged gear wheel 7, by engaging the rack 8ª of the bearing brackets 8, raises or lowers the base frame, as the case may be. The worm gear 5 is at all times held in engagement with the worm wheel 4 by an idler gear 5ˣ journaled in brackets 9 which are loosely mounted on the wheel axles and motion is imparted to the said worm gear by a crank or other device (not shown) fitted onto the upper squared end 10 of the gear shaft 6.

The steering of the front wheel 2 is effected through the gear connection 11, the operating shaft 11ª thereof being mounted in suitable bearings and fitted at its end, adjacent to the driver's seat with a hand-operated wheel 12, (see Figs. 1 and 2).

At a point near the front and on the left side of the base frame, is mounted the cutter devices which are pivotally supported on a special frame 13, (see Figs. 10 and 13) which extends slightly from the side of the framing. I desire it understood that I do not wish to be limited to any particular structure of cutter member, although in the present case I have shown the same to be a somewhat V-shaped blade 20 adjustably and hingedly mounted at the bottom of a chute or platform 21 that is hingedly connected to the upper platform 22, from the inner side of which projects laterally, then upwardly, at an angle, the narrow chute 23 in which the lower or butt ends of the cut stalks rest while being conveyed to the separator devices. The separator devices are supported on the upper structure 70 hereinafter more fully explained.

To provide for the adjustment, up and down, of the inclined cutter carrying platform 21, I provide toggle devices 15 (see Figs. 17 and 19) operated by a lever 14 adjacent to the driver's seat and, as clearly shown in Figs. 17, 19 and 20, the said devices operate to raise or lower the cutter, as the case may be, but always tend to keep it in the same cutting relation to the ground. To provide further adjustment of the cutter blade in order to keep the same from digging in, if the condition arises, I provide the main toggle lever 16 or cutter supporting arm with a set screw and rack arrangement 17, as clearly illustrated in Fig. 12 of the drawings.

It is to be understood that the cane stalks are fed into the machine in the vertical position just as they are cut and, in their travel up the cutter platform the butt ends of the stalks are guided and held on the said platform by the guides 18 and 19, one at each side thereof. To provide for guiding the stalks (some of which may be broken or bent over) into the machine in the upright position, upwardly inclined guide bars 24—25 are included, (see Figs. 15 and 16) their lower or foremost extended ends being widely spread to effectively accomplish this purpose. To insure, even better, the certain infeed of the stalks, I also provide, as is clearly shown in Figs. 10, 15 and 16, a plurality of feed chains 26, the upper sets of which are mounted on the upper sides of the guides 24—25 and the separate units of each set are gear-connected at 27 to turn in the same feed-in direction. The lower set of chains is mounted on suitable brackets 28 suspended from guide bars and each consists of a single pivoted chain, the one on the inner side being driven by the shaft 29 by which motion is imparted to the sprocket chain 30 which drives the upper feed-in chain on this side, and the outer one being similarly driven by a sprocket chain 31 on the shaft 32 which drives the upper feed-in chain on this side. The above mentioned power shafts 29—32 are, through knuckle joints 33, driven from a series of plate gears mounted on a suitable casting 34, the innermost one of which, driven by a sprocket chain and bevel gear connection 35 with the power shaft 36, imparts rotary motion to the power shaft 29 while the outermost one 34ª imparts similar motion to the opposite shaft 32. The peculiarly constructed casting 34 forms a support for the cutter devices, and the upper and lower guide rods, and is the lower pivot for the reversible cutting and feed-in mechanism, the upper pivot therefor being a part of the innermost upper guide rod and the same has bearing in a suitable brace bar 37 (see Figs. 13 and 15) suitably fastened to the bed of the machine.

To provide for turning the cutter and feed-in devices upon the pivots above described, I employ a bevel gear segment 38 which is engaged by a pinion 39 at one end of an operating shaft 40 (see Figs. 13 and 14) the shaft 40 being suitably mounted in brackets on the machine bed and being provided with a hand wheel 41 located adjacent to the driver's seat. It will be readily seen, by referring to Figs. 13 and 14, that when motion is imparted to the shaft 40, in one direction, the whole mechanism will be shifted to the position indicated by dotted lines in Fig. 10. For effectively holding the cutting elements, as illustrated by the aforesaid devices, I provide the control wheel 41 with an internally toothed band 42 that is engaged by a locking dog 42ª which tends to hold the operating shaft locked to any position desired. As the cane stalks in their travel up the cutter platform under the action of the in-feed chains 26, pass up out of engagement with the upper and lower feed chains on the outer side (they being shorter than the opposing pair) they are engaged by springs guide bars 26ª—26ᵇ, (Figs. 10 and 16) which hold the stalks against the inner feed chains and guide the same into position to be further guided around the chain bands by other guide members 43, the same being concentric with the inner chain sprocket.

When the parts are reversed, as shown in dotted lines in Fig. 10, the said guide members 43 are swung out of the way, they being unnecessary to effect the guide-in of the stalks. These members are swung out of the way by a toggle link connection 44 with the outer brace bracket 38 and its operation will be readily understood by reference to Figs. 10 and 15.

Assume that the parts are in their normal position, the cane stalks having been guided around the axis of the inner sprocket, they are now caught by the upper and lower staggered feed chains 45—46 (see Figs. 10 and 11). The peculiar staggered arrangement of the said chain causes the butt ends of the cane stalks to ride in engagement with the lower chain 46 into the chute 23, while the head ends thereof are engaged by the chain 45 and guided by the member 47 which is rigidly mounted on the member 37, thus causing the cane stalks to slant decidedly to the left. Thus when the whole stalk has turned into the straightway portion of the conveyer 23, it will be found that the stalk, instead of now being in approximately a vertical position in relation to the ground, is in a vertical position in relation to the straight upward slant of the said chute *i. e.*, they are in a position parallel to a line drawn from the end of the upper chain to the end of the lower chain or substantially parallel to the frame bar 70 at the right hand side of Fig. 1. The stalks are thus carried upward to the separator conveyers on the upper structure 70 (see Fig. 1) by the conveyer chains 48—49 hereinafter referred to. The chains 45 and 46 are driven by a shaft 50 having bearings in the upright members 51 (see Figs. 17 and 18), the lower end of said shaft being fitted with a beveled pinion 52 that meshes with a like pinion 53 on the drive shaft 36.

The main conveyer chains 48—49, before referred to, have their sprockets, shaft and driving gears at the lower end supported in a right angled bracket 54 which is suitably fastened to the bed of the machine. Motion is imparted to the conveyer sprocket from the beveled gear 55 on the drive shaft 36 by a beveled pinion 56 which is mounted on the end of a shaft 57 that has suitable bearings in braces on the support 54, and intermediate its length, it is provided with a beveled gear 58 (see Fig. 17) which meshes with a composite gear and sprocket that drives the lower conveyer chain 49. At its end, keyed or otherwise fastened, is another beveled gear 59 which, through its gear connection with the shaft 60, forms the driving means for the upper conveyer chain 48. At the upper end the conveyer chain sprockets have bearings on a suitable bracket 48ª (see Fig. 1) which form a part of the upper separator-conveyer-carrying structure 70.

The cane stalks in their travel up the chute 26 are engaged at their head and butt ends by chains 48—49 from the inner or machine side and at the outer side the head ends are guided and held against the conveying means by a guide rod 61, (see Fig. 1) which extends from the point at which the stalks leave the chain 45, up to and across the conveyer platform hereinafter described.

As indicated by the arrows on Fig. 3, the cane stalks, after leaving the conveyer chains, come in contact with the spiral conveyer 62, and while being conveyed the length thereof the position of the stalks is gradually changed, (owing to the peculiar shape of the platform 63) from its former approximately vertical position to a horizontal one and in this manner is dropped to the first of a series of separator conveyers, the purpose and operation of which will presently appear.

The cane supporting platform 64 of the upper structure 70 is peculiar in shape and includes the cane head support 63 shaped as best indicated in Figs. 1, 3, 4 and 7. On the opposite side thereof, or to the right of the opening in which the conveyer 62 operates, is a trough-like portion 65 (see Fig. 1) in which rests the butts of the cane while going through their change of position from the vertical to the horizontal.

The shaft of the conveyer 62 has its outer bearing in a bracket member 62ª fastened and braced to the main upper structure 70, and at the inner end it has bearing in a cross bar 66 bolted or otherwise made secure to the upper framing and the said inner end of the shaft projected beyond said cross bearing is provided with a bevel pinion 67 that is driven by the gear 68 on a drive shaft 69, as will presently appear.

By reference to Figs. 1 and 7, it will be readily understood how the cane stalks, their heads resting upon the platform portion 63 and their butts in the trough 65 and under the conveyer shaft, go through the change of position. They have been also guarded from any tendency that may occur to buckle up away from the platform, by the inturned end 61ª of the guide rod 61. At a point just under the cross bar 66 the platform is turned down at a sharp angle, as at *x* (see Fig. 4) to allow for the dropping of the stalks onto the separator-conveyers. The first of the series of these separator-conveyers is in the nature of a small diameter spiral conveyer 71 and its shaft 72 is journaled at 73—73ª on parts of the upper framing. This spiral conveyer 71 is driven by a beveled gear connection 74 with the drive shaft 75 so as to be driven thereby, as will be hereinafter made clear.

It will be noticed, by reference to Figs. 8 and 9 of the drawings, that the conveyer 71 is constructed so that but one stalk of cane will fit into its blade spacings at a time and, no matter how many stalks may be piled up thereon, they are restricted by the stop dog 76 on the diagonal cross bar 77, so that only one stalk will be fed to the pointed end of the main separator-conveyer 78, at a time.

The main separator-conveyer shaft, as is the case with the adjacent auxiliary conveyers, has its rear end journaled in bearings on the diagonal cross bar 77 and the front end journaled in bearings on a cross bar 82 with the projecting shaft ends driven by bevel pinion connections 83 with the drive shaft 84. This causes all of the conveyers 78—79—80 to revolve in the same direction. I do not wish, in practice, to be limited to any special construction or number of conveyers used except that the main or largest one be pointed at the place of engagement with the spiral conveyer 71.

In the drawings, to illustrate a practical construction I have shown three spiral conveyers, the main one 78 of which is of compound conical shape, the middle one 79 an ordinary type and the outermost one 80 conically enlarged at the rear end. Each of the said spirals is embedded in suitable depressions or pockets 81 in the platform 64 so as to bring their shafts almost down on the level therewith. Adjacent to each conveyer is a guide rod 85, rigidly connected to the cross bar 77 which serves to guide and support the cane on its down travel over the several conveyer chains 86. The chains 86 are driven by a gear connection 86ª with the drive shaft 84 of the top-evening and stalk assorting flukes hereinafter explained. It might be stated that the several drive shafts 84, 75 and 69, before referred to, all receive power through their respective sprocket attachments, by a chain drive 87 connected to the sprocket shaft 90ª of the aforesaid fluke mechanism nearest that side of the machine.

The cane stalks now, in supported condition, pass down over the various chains 86, guided by rods 85, and drop onto the assorting and head-evening flukes 88, they being so spaced apart as to receive one cane stalk in each of the spaces $y$, (see Fig. 4). Each of the said flukes 88 is in the nature of a thin flat board having a slot in its lower edge of the side toward the rear of the machine and a like slot spaced slightly away from the opposite edge. In these slots of each board is rigidly fastened a link of the endless chains 89—89, in any approved manner. At each of the extremities of said mechanism, the chains take over sprockets on shafts 90—90ª, the one 90 of which is driven by a bevel gear connection 91 with a drive shaft 92, hereinafter more fully described.

A little inside and adjacent to the power shafts 90—90ª at each end is a stout cross bar 92ˣ (Fig. 22) and the said bar has bearings for each of a plurality of shafts 94, running crosswise in relation to the flukes 88 and each carrying a hollow or light-weight roller 95. Each of said cross shafts 94 is gear-connected at 96 to the power shaft 90 so as to turn all of the rollers in the direction indicated by the arrows in Fig. 23. At the side of the fluke mechanism, toward the front of the machine there is hinged and adjustably mounted in any approved manner, a head board 97. see Fig. 4.

In their travel across the fluke mechanism, the cane stalks are, by the action of the rollers 95, forced against the head board 97, the end leaves being bent back by the light springs 97ª thereon, thus allowing the stalk ends to engage the head board, evening them to insure a positive gripping of the same, as hereinafter described.

Referring to Fig. 1 of the drawings, it will be seen that the rear portion of the machine bed and the upper frame structure is built on a slant, and the rear of the machine, being high, causes the cane, in all instances, to tend to gravitate to a lower point, thus greatly assisting the functioning of the rollers 95 in their effort to bring the stalk heads forcibly into contact with the head board 97. Between each pair of rollers is a cross bar 98 and said bar is in such close relation to said rollers as to make any clogging of the leaves impossible.

To further insure the proper heading of the cane stalks I provide the mechanism with shaker arms 99 that extend crosswise thereof, as shown in Fig. 22, and the said shakers operate in slots 88ª in flukes 88. The shakers are oscillated by eccentrics 100 on the shafts 94 and which, through the lever arms 101 (pivoted at 102 to the cross bar 98) effect the shaking motion. The fluke members 88 have cut-out portions 88ᵇ concentric and snugly fitting over the rollers 95 and to further insure the smooth travel of the cane stalks through the mechanism, I cover the gears and end mechanism of each roller with a cover or hood member 103 constructed and applied as clearly shown in Figs. 22, 23 and 25 of the drawings. The cane stalks now having their heads evened drop down onto the receiving or bottom pan 104, the heads being caught by the conveyer chains 105 and coöperative guide 106. Should any stalk have a tendency to stick to the flukes 88 it will be pulled away by rigid member 107 which projects up on a line with the upper edge of the rollers and through slots 108 in each of the flukes (see Fig. 22.) The cane now (by a horizontal conveyer chain 109, on a shaft 110 driven by a sprocket chain 111 from the drive shaft 112) is conveyed laterally until it engages the drag carrying chain 113 (Figs. 2, 26 and 27) whose power sprockets 114 are fixed on stub shafts mounted on a bearing bracket 115, one of which is gear-connected at 116 with a shaft 117 driven from the bevel gear 91. The drag chain 113 is equipped with metal drags 113ª, so constructed as to advance the stalks one at a time, as indicated in Figs. 26—27, to a position where they will be gripped by one of the automatic grippers on the endless chain 118.

Each link of the gripper chain 118 consists of a gripping mechanism and an operating dog. The gripper mechanisms are in the nature of opposing gripping fingers 119—119, each of which is mounted so as to turn loosely on a shaft 120 and is link-connected as at 121 to the operating dog 122 of the preceding link. It will be readily apparent from Figs. 26 to 28, inclusive, that when the gripper chain is running along between its power sprocket (the rear or drive one of which is a composite bevel gear and sprocket wheel 123) the gripper members will remain tightly closed; but when the chain is passing around either sprocket it will be seen that the operating dog of each preceding link being raised out of longitudinal alinement with the following gripper devices will spread the links to force open the gripper jaws 119 to be again closed in on a waiting stalk head. The stalks thus being dragged across the machine floor with their head ends in close proximity causes the butt ends to assume a sort of fan-like formation and as the grippers advance in their diagonal path toward the front of the frame the said stalks are dragged through the main leaf stripping devices and cause them to revolve slowly, thus greatly aiding in stripping the leaves from the stalks.

The stripper wheels are made up of a multitude of thin steel blades 124 held tightly in place by the opposing plates 125 which are screw bolted together, as at 126. The stripper wheels are loosely mounted to rotate or revolve around a pivot 127 which screws into a circular plate 128 (see Fig. 31) whose center is a slight distance above the wheel center making it eccentric in relation thereto, and the purpose of this structure is that should any of the stripped leaves tend to entangle among the flat steel blades, its steel bound edge 129 will shave them off. This blade 128 is rigidly connected to the supporting bar 130 and supports the plurality of units in a staggered manner. Just to the front of the stripper wheels is mounted a guide rod 131 whose upper face adjacent to the strippers is sharpened so as to shear off leaves on the bottom of the stalks when they are dragged thereover.

That portion of the machine bed on which the cane stalks are now dragged is covered with a substantially triangular raised base plate 132 which slants away from the gripper chain toward the off-take and conveyer mechanism hereinafter specifically explained and is supported by brace irons 133 (see Fig. 32).

When the cane stalks, one by one, are dragged to the end of movement of the gripper chains and released thereby as the chain goes down over the sprocket 118$^a$ (suitably journaled in brackets 134) it comes into engagement with a toothed wheel 135. This toothed wheel is fixedly mounted on a long cross shaft 136 to which motion is imparted by a driven shaft 137 and bevel gear connections 138 also driven from drive shaft 112. The shaft 136 at its outer or front end is gear-connected at 139 to the cutter shaft 140 which carries an adjustable cutter 141 (see Fig 2). To make the cutter adjustable to any length of cut desired, I provide a screw shaft 142 which carries a screw fed arm 142$^a$ attached to a hub on the cutter wheel and which, when operated by a hand wheel 145, adjacent the driver's seat, through the shaft 144 and worm connection 143, moves the cutter wheel to make a shorter or longer cut, as desired.

The shaft 136 which carries the toothed wheel 135, also carries sprocket wheels which operate several conveyer chains 146, by which, while the stalk heads are being cut, the stalks are simultaneously being conveyed upwardly on the inclined platform 147 to be dropped on the take-up conveyer 148 and loaded thereon to a wagon or like container. One of the inclined platforms 147, is shown in detail in Fig. 38.

Two suitably spaced pivot bars 149 are provided to form pivots 150 for the bottom ends of the adjustable conveyer 148 and they include platforms 151 similar to the platforms 147 and from each of these, by a bracket 152, is supported a head-board 153 which evens the stalks before they are dropped onto the off-take conveyer chains 154. Should a butt end of a stalk reach the head-board first it will be forced to wait for the head end to come even before it can drop to the conveyer chains.

The off-take conveyer is constructed as best shown in Figs. 1 and 32 and has the spaces between the chains 154 covered with a sheet metal covering 155. The conveyer also includes a means operable by a crank 156 adjacent to the driver's seat, for raising or lowering the said conveyer.

To provide power for operating the numerous drive shafts I propose to use any conventional type of internal combustion engine 200 (see Fig. 1) and provide the shaft thereof with a bevel pinion 201 which meshes with a gear 202 and drives the shaft 112; this gear, through the sprocket chain 203 drives the reverse gears 204, equipped with a clutch 205 and lever 206 for control by the driver.

I also provide a friction clutch 207 on a sleeve and operable by a lever adjacent to the driver's seat and which coöperates with the reverse gears in effecting the cutting-in and out of the various drive shafts.

In some instances an abnormally long stalk of cane is encountered and to provide for cutting off the projecting head end I provide the platform 63 with a set of rigidly held knives 63$^a$, the operations of which are readily apparent.

To further insure the evening of the stalk heads, the rollers 95 may have their engaging faces corrugated.

In Fig. 39 I have illustrated more clearly the arrangement of the driving wheels 3 with relation to the shaft. The wheel 3, at one side is keyed to the shaft as shown and at the other side is keyed on a sleeve 3$^z$ which turns loosely on the shaft and to which one of the gears 3$^g$ of the differential mechanism is keyed, the other gear 3$^h$ of the differential mechanism being keyed to the shaft 3$^x$.

The gears 7 and 4 are connected together and one set at one side of the machine is mounted to turn on the sleeve 3$^z$ while the other set is mounted to turn on the other end of the shaft 3$^x$, the parts being held from endwise movement on the shaft by the caps 1 and screws 3ᵏ, the driving chain 3ᶜ taking over the drive sprocket 3ᵈ of the differential mechanism.

What I claim is:

1. In a cane harvesting machine, a base frame, wheel supports therefor, a cutting mechanism carried by said frame, an elevator to carry the stalks from the cutting mechanism, stalk turning mechanism for receiving the stalks from the elevator and turning the same to the horizontal position, stalk separating mechanism adapted to receive the stalks from the turning mechanism, stalk assorting and head-evening mechanism, a bottom pan for receiving the stalks from the assorting and head-evening mechanism, a conveyer for carrying the stalks along the bottom pan, individual stalk advancing mechanism, stalk gripping and conveying mechanism, stripping devices through which the stalks are drawn lengthwise by said stalk gripping and conveying mechanism, stalk topping mechanism, and means to discharge the material from the machine.

2. In a cane harvesting machine, a base frame wheel supports therefor, a cutting mechanism carried by said frame, an elevator to carry the stalks from the cutting mechanism, stalk turning mechanism receiving the stalks from the elevator, stalk separating mechanism for receiving the stalks from the turning mechanism, downward conveying mechanism for carrying the stalks individually downward from the stalk separating mechanism, stalk assorting and head-evening mechanism for receiving the stalks from the downward conveyer, a bottom pan for receiving the stalks from the assorting and head-evening mechanism, a conveyer for carrying the stalks along the bottom pan, individual stalk advancing mechanism, stalk gripping and conveying mechanism, a stripper through which the stalks are drawn longitudinally by said stalk gripping and conveying mechanism, a base plate over which the stalks are carried by said gripping and conveying mechanism, a topping mechanism, and means for discharging the stalks from the machine.

3. In a cane harvesting machine, a base frame, a cutting mechanism carried by said frame, means for reversibly mounting said cutting mechanism on said frame, an elevator for carrying the stalks from the cutting mechanism, stalk turning mechanism to which the elevator delivers the stalks, stalk separating mechanism receiving the stalks from the turning mechanism, a downward conveyer for carrying the stalks individually downward from the separating mechanism, stalk assorting and head-evening mechanism to which the stalks are delivered by the downward conveyer, individual stalk advancing mechanism, means for carrying the stalks from the assorting and head-evening mechanism to the individual stalk advancing mechanism, stalk gripping and conveying mechanism for receiving the stalks from the individual stalk advancing mechanism, a stripper through which the stalks are drawn lengthwise, a topping mechanism, and means for discharging the stalks from the machine.

4. In a cane harvesting machine, a base frame, a cutting mechanism carried by said frame, means for reversibly mounting said cutting mechanism on said frame, means for turning said cutting mechanism to operate when the vehicle is moving either forwardly or rearwardly, an elevator for carrying the stalks from the cutting mechanism, a stalk turning mechanism to receive the stalks from the elevator and turn them horizontally, stalk separating mechanism receiving the stalks from the turning mechanism, a conveyer for carrying the stalks individually from the stalk separating mechanism, stalk assorting and head-evening mechanism to which the stalks are carried by said last named conveyer, individual stalk advancing mechanism, means for carrying the stalks from the assorting and head-evening mechanism to the individual stalk advancing mechanism, stalk gripping and conveying mechanism, strippers through which the stalks are drawn lengthwise by said gripping and conveying mechanism, stalk topping mechanism, and means for discharging the stalks from the machine.

5. In a cane harvesting machine, a base frame, a cutting mechanism carried by said frame at one side of the machine, means for reversibly mounting said cutting mechanism on said frame, means for turning said cutting mechanism to operate on the same side of the machine when the vehicle is moving either forwardly or backwardly, said cutting mechanism comprising a platform supporting sub-frame, a platform on said sub-frame, a cutter at the entrance to said platform, and means for raising and lowering said platform.

6. In a cane harvesting machine, a base frame, a cutting mechanism carried by said frame at one side of the machine, means for reversibly mounting said cutting mechanism on said frame, means for turning said cutting mechanism to operate on the same side of the machine when the vehicle is moving either forwardly or backwardly, said cutting mechanism comprising a platform supporting sub-frame, a platform on said sub-frame, a cutter at the entrance to said platform, said cutter being hinged to said platform, means for moving said cutter on its hinge to adjust the same, and means for raising and lowering said platform.

7. In a cane harvesting machine, a base frame, wheel supports therefor, a cutting mechanism carried by said frame, said cutting mechanism comprising a platform supporting sub-frame, a platform on said sub-frame, feed-in chains coöperative with said platform, entering guide bars and spring bars coöperative with said feed-in chains, and hinged curved guides adjacent to the discharge end of said feed-in chains.

8. In a cane harvesting machine, a base frame, wheel supports therefor, a cutting mechanism carried by said frame, means for reversibly mounting said cutting mechanism on said frame, said cutting mechanism comprising a platform supporting sub-frame, a platform on said sub-frame, feed-in chains adjacent to said platform, entering guide bars, and spring guide bars coöperative with said chains, a curved guide bar adjacent to the discharge end of said chains, and means for turning said cutting mechanism to operate when the vehicle is moving either forwardly or rearwardly.

9. In a cane harvesting machine, a base frame, wheel supports therefor, a cutting mechanism carried by said frame, means for reversibly mounting said cutting mechanism on said frame, said cutting mechanism comprising a platform supporting sub-frame, a platform on said sub-frame, feed-in chains adjacent to said platform, entering guide bars, spring guide bars coöperative with said chains, means for turning said cutting mechanism to operate when the vehicle is moving either forwardly or rearwardly, and means for holding said cutting mechanism in its different operative positions.

10. In a cane harvesting machine, a base frame, wheel supports therefor, a cutting mechanism carried by said frame, means for reversibly mounting said cutting mechanism on said frame, said cutting mechanism comprising a platform supporting sub-frame, a platform on said sub-frame, stalk guides coöperative with said platform, a cutter at the entrance to the platform, said cutter being hinged to said platform, means for moving said cutter on its hinge to adjust the same, means to raise and lower said platform, entering guide bars, feed-in chains coöperative with said guide bars, spring guide bars coöperative with said chains, a hinged curved guide adjacent to the discharge end of said chains, means for turning said cutting mechanism to operate when the vehicle is moving forwardly or rearwardly, said means comprising a gear segment in the platform supporting frame, means controlled from the operator's position for actuating said segment, means for holding said cutting mechanism in its different operative positions.

11. In a cane harvesting machine, a base frame, wheel supports therefor, a cutting mechanism carried by said frame, an elevator to carry the stalks from the cutting mechanism, said elevator comprising an upwardly inclined chute and feed chains for advancing the stalks from the cutting mechanism platform and holding the same normal to the plane of the chute, stalk turning mechanism receiving the stalks from said chute and turning the same to the horizontal position, stalk separating mechanism receiving the stalks from the turning mechanism, stalk assorting and head-evening mechanism, stalk advancing mechanism, stalk gripping and conveying mechanism, stripper devices through which the stalks are drawn by said gripping and conveying mechanism, a topping mechanism, and means for discharging the stalks from the topping mechanism.

12. In a cane harvesting mechanism, a base frame, wheel supports therefor, a cutting mechanism carried by said frame, an elevator for carrying the stalks from the cutting mechanism, said elevator comprising an upwardly inclined chute and feed chains for advancing the stalks from the cutting mechanism platform and holding the same normal to the plane of the chute, guide rods coöperative with said chains, a stalk turning mechanism, a separating mechanism, a stalk assorting and head-evening mechanism, individual stalk advancing mechanism, stalk gripping and conveying mechanism, a stripper through which the stalks are drawn by said gripping and conveying mechanism, and means for discharging the stalks from the machine.

13. In a cane harvesting machine, wheel supports therefor, a cutting mechanism carried by said frame, an elevator for carrying the stalks from the cutting mechanism, said elevator comprising an upwardly inclined chute and feed chains for advancing the stalks from the cutting mechanism platform and holding the same normal to the plane of the chute, guide rods coöperative with said chains, a stalk turning mechanism, a stalk separating mechanism, a stalk assorting and head-evening mechanism, individual stalk advancing mechanism, stalk gripping and conveying mechanism, a stripper through which the stalks are drawn by said gripping and conveying mechanism, a stalk topping mechanism, and means for discharging the stalks from the machine.

14. In a cane harvesting machine, a base frame, wheel supports therefor, a cutting mechanism carried by said frame, an elevator for carrying the stalks from the cutting mechanism, said elevator comprising an upwardly inclined chute and feed chains for advancing the stalks from the cutting mechanism platform and holding the same normal to the plane of the chute, guide rods coöperative with said chains, a stalk turning mechanism, a stalk separating mechanism, a bottom pan for receiving the stalks from the assorting and head-evening mechanism, a horizontal conveyer for carrying the stalks along the bottom pan, individual stalk advancing mechanism, stalk gripping and conveying mechanism, stripping mechanism through which the stalks are drawn by said gripping and conveying mechanism, stalk topping mechanism and means for discharging the material from the machine.

15. In a cane harvesting machine, a base frame, means in virtue of which the frame may be moved over the field, cutting mechanism carried by said frame, an elevator to carry the stalks from the cutting mechanism, stalk turning mechanism receiving the stalks from the elevator and comprising a transverse spiral conveyer, a turn-over platform coöperative therewith, stalk separating mechanism receiving the stalks from the turning mechanism, stalk assorting and head-evening mechanism, individual stalk advancing mechanism, stalk gripping and conveying mechanism, stripping mechanism through which the stalks are drawn by said gripping and conveying mechanism, stalk topping mechanism and means for discharging the material from the machine.

16. In a cane harvesting machine, a base frame, means in virtue of which said frame may be transported over the field, a cutting mechanism carried by said frame, an elevator for carrying the stalks from the cutting mechanism, a stalk turning mechanism receiving the stalks from the elevator, and comprising a transverse spiral conveyer, a turn-over platform coöperative therewith, guide rods coöperative with said conveyer and platform, stalk separating mechanism for receiving the stalks from the turning mechanism, stalk assorting and head-evening mechanism, stalk gripping and conveying mechanism, means for advancing the stalks individually from said assorting and head-evening mechanism to said stalk gripping and conveying mechanism, mechanism through which the stalks are drawn to said gripping and conveying mechanism, stalk topping mechanism, and means for discharging the material from the machine.

17. In a cane harvesting machine, a base frame, means in virtue of which said frame may be transported over the field, a cutting mechanism carried by said frame, an elevator for carrying the stalks from the cutting mechanism, a stalk turning mechanism receiving the stalks from the elevator and comprising a transverse spiral conveyer, a turn-over platform coöperative therewith, guide rods coöperative with said conveyer and platform, stalk separating mechanism for receiving the stalks from the turning mechanism, stalk assorting and head-evening mechanism, stalk gripping and conveying mechanism, means for advancing the stalks individually from said assorting and head-evening mechanism to said gripping and conveying mechanism, stripping mechanism through which the stalks are drawn by said gripping and conveying mechanism, and means for discharging the material from the machine.

18. In a cane harvesting machine, a base frame, a cutting mechanism carried thereby, an elevator carrying the stalks from the cutting mechanism, a stalk turning mechanism, a stalk separating mechanism comprising an under platform, an infeed spiral conveyer adapted to receive the stalks and convey them away from the stalk turning mechanism, a separating conveyer-spiral receiving the stalks from said infeed spiral, stalk assorting and head-evening mechanism, individual stalk advancing mechanism, stalk gripping and conveying mechanism, a stripper mechanism through which the stalks are drawn by said gripping and conveying mechanism, topping mechanism, and means for discharging the material from the machine.

19. In a cane harvesting machine, a base frame, a cutting mechanism carried thereby, an elevator carrying the stalks from the cutting mechanism, a stalk turning mechanism, a stalk separating mechanism comprising an under platform, an infeed spiral conveyer adapted to receive the stalks and convey them away from the stalk turning mechanism, a compound conical separating conveyer-spiral for receiving the stalks from the infeed spiral, assorting and head-evening mechanism, individual stalk advancing mechanism, stalk gripping and conveying mechanism, a stripping mechanism through which the stalks are drawn by said gripping and conveying mechanism, topping mechanism, and means for discharging the material from the machine.

20. In a cane harvesting machine, a base frame, a cutting mechanism carried thereby, an elevator carrying the stalks from the cutting mechanism, a stalk turning mechanism, a stalk separating mechanism comprising an under platform, an infeed spiral conveyer adapted to receive the stalks and convey them away from the stalk turning mechanism, a separating conveyer-spiral receiving the stalks from said infeed spiral, stalk assorting and head-evening mechanism, individual stalk advancing mechanism, stalk gripping and conveying mechanism, a stripping mechanism through which the stalks are drawn by said gripping and conveying mechanism, topping mechanism, and means for discharging the material from the machine, and conveyer mechanism for carrying the stalks individually away from the stalk separating mechanism.

21. In a cane harvesting machine, a base frame, a cutting mechanism carried thereby, an elevator carrying the stalks from the cutting mechanism, a stalk turning mechanism, a stalk separating mechanism comprising an under platform, an infeed spiral conveyer adapted to receive the stalks and convey them away from the stalk turning mechanism, a compound conical separating conveyer-spiral for receiving the stalks from the infeed spiral, assorting and head-evening mechanism, individual stalk advancing mechanism, stalk gripping and conveying mechanism, a stripping mechanism through which the stalks are drawn by said gripping and conveying mechanism, topping mechanism, means for discharging the material from the machine, conveyer mechanism for carrying the stalks individually away from the stalk separating mechanism.

22. In a cane harvesting machine, a base frame, a cutting mechanism carried thereby, an elevator for carrying the stalks from the cutting mechanism, stalk turning mechanism for receiving the stalks from the elevator, stalk separating mechanism receiving the stalks from the turning mechanism, conveyer mechanism for carrying the stalks individually from the stalk separating mechanism, and comprising a conveyer chain and guide rods coöperative with said conveyer chain, stalk assorting and head-evening mechanism, stalk gripping and conveying mechanism, means for transferring the stalks from the assorting and head-evening mechanism individually to said stalk gripping and conveying mechanism, strippers through which the stalks are carried by said gripping and conveying mechanism, stalk topping mechanism, and means for delivering the material from the machine.

23. In a cane harvesting machine, a base frame, a cutting mechanism carried thereby, a conveyer for carrying the stalks from the cutting mechanism, stalk turning mechanism receiving the stalks from said conveyer, stalk separating mechanism receiving the stalks from said turning mechanism, stalk assorting and head-evening mechanism comprising a fluke chain, rollers for moving the stalks transversely of the direction of movement of the fluke chain and a head board, individual stalk advancing mechanism, stalk gripping and conveying mechanism, stripping mechanism through which the stalks are drawn, stalk topping mechanism, and means for discharging the material from the machine.

24. In a cane harvesting machine, a base frame, a cutting mechanism carried thereby, an elevator for carrying the stalks from the cutting mechanism, stalk turning mechanism receiving the stalks from the elevator, stalk separating mechanism receiving the stalks from the turning mechanism, stalk assorting and head-evening mechanism, said stalk assorting and head-evening mechanism comprising endless fluke carrying chains, a head board, means for bringing the heads of the stalks against the head board, individual stalk advancing mechanism, stalk gripping and conveying mechanism, stripping mechanism through which the stalks are drawn, stalk topping mechanism, and means for discharging the material from the machine.

25. In a cane harvesting machine, a base frame, a cutting mechanism carried by said frame, an elevator to carry the stalks from the cutting mechanism, stalk turning mechanism receiving the stalks from the elevator, stalk separating mechanism, stalk assorting and head-evening mechanism comprising an endless fluke chain, transverse rollers for moving the stalks transverse of the direction of movement of the fluke chain, a head board at one side of the fluke chain toward which the stalks are moved by said rollers, individual stalk advancing mechanism, stalk gripping and conveying mechanism, stripping mechanism through which the stalks are moved, stalk topping mechanism, and means for discharging the material from the machine.

26. In a cane harvesting machine, a base frame, a cutting mechanism carried by said frame, an elevator to carry the stalks from the cutting mechanism, stalk turning mechanism receiving the stalks from the elevator, stalk separating mechanism, stalk assorting and head-evening mechanism comprising an endless fluke chain, transverse rollers for moving the stalks transversely of the direction of movement of the fluke chain, a head board at one side of the fluke chain toward which the stalks are moved by said rollers, shaker devices coöperating with the flukes and rollers, individual stalk advancing mechanism, stalk gripping and conveying mechanism, stripping mechanism through which the stalks are moved, stalk topping mechanism, and means for discharging the material from the machine.

27. In a cane harvesting machine, a base frame, a cutting mechanism carried by said frame, an elevator to carry the stalks from the cutting mechanism, stalk turning mechanism receiving the stalks from the elevator, stalk separating mechanism, stalk assorting and head-evening mechanism comprising an endless fluke chain, transverse rollers for moving the stalks transversely of the direction of movement of the fluke chain, a head board at one side of the fluke chain toward which the stalks are moved by said rollers, springs on said head board for bending back the head leaves, cross bars between said rollers, shaker devices coöperative with said flukes and rollers, individual stalk advancing mechanism, stalk gripping and conveying mechanism, stripping mechanism through which the stalks are moved, stalk topping mechanism, and means for discharging the material from the machine.

28. In a cane harvesting machine, a base frame, a cutting mechanism carried by said frame, an elevator to carry the stalks from the cutting mechanism, stalk turning mechanism receiving the stalks from the elevator, stalk separating mechanism, stalk assorting and head-evening mechanism comprising an endless fluke chain, transverse rollers for moving the stalks transversely of the direction of movement of the fluke chain, a head board at one side of the fluke chain toward which the stalks are moved by said rollers, springs on said head board for bending back the head leaves, cross bars between said rollers, shaker devices coöperative with said flukes and rollers, said shaker devices comprising arms and eccentric mechanism for shaking said arms, individual stalk advancing mechanism, stalk gripping and conveying mechanism, stalk feeding means and means for discharging the material from the machine.

29. In a cane harvesting machine, a base frame, a cutting mechanism carried by said frame, an elevator for carrying the stalks from the cutting mechanism, stalk turning mechanism, stalk separating mechanism, stalk assorting and head-evening mechanism, individual stalk advancing mechanism including drag chains for advancing the stalks singly, stalk gripping and conveying mechanism including head end gripping and advancing devices, strippers through which the stalks are drawn, topping mechanism, and means for discharging the material from the machine.

30. In a cane harvesting machine, a base frame, a cutting mechanism carried by said frame, an elevator for carrying the stalks from the cutting mechanism, stalk turning mechanism, stalk separating mechanism, stalk assorting and head-evening mechanism, individual stalk advancing mechanism, stalk gripping and conveying mechanism which comprises an endless diagonally disposed chain with grippers, and operating dogs for said grippers, strippers through which the stalks are drawn, stalk topping mechanism, and means for discharging the material from the machine.

31. In a cane harvesting machine, a base frame, a cutting mechanism carried by said frame, an elevator for carrying the stalks from the cutting mechanism, stalk turning mechanism, stalk separating mechanism, stalk assorting and head-evening mechanism, individual stalk advancing mechanism, stalk gripping and conveying mechanism, strippers through which the stalks are drawn lengthwise by said gripping and conveying mechanism, said strippers comprising radial-blade wheels with fixed stripping disks coöperative with said wheels, topping mechanism, and means for discharging the material from the machine.

32. In a cane harvesting machine, a base frame, a cutting mechanism carried by said frame, an elevator for carrying the stalks from the cutting mechanism, stalk turning mechanism, stalk separating mechanism, stalk assorting and head-evening mechanism, individual stalk advancing mechanism, stalk gripping and conveying mechanism, strippers through which the stalks are drawn lengthwise by said gripping and conveying mechanism, said strippers comprising radial-blade wheels with fixed stripping disks coöperative with said wheels, and a shearing edge bar coöperative with said wheel, topping mechanism, and means for delivering the material from the machine.

33. In a cane harvesting machine, a base frame, a cutting mechanism carried thereby, an elevator for carrying the stalks from the cutting mechanism, stalk turning mechanism receiving the stalks from the elevator, stalk separating mechanism, stalk assorting and head-evening mechanism, individual stalk advancing mechanism, stalk gripping and conveying mechanism, stripping devices through which the stalks are drawn, a topping mechanism which comprises a toothed head receiving wheel and rotary topping blades coöperative therewith, and means for discharging the material from the machine.

34. In a cane harvesting machine, a base frame, a cutting mechanism carried by said frame, said cutting mechanism comprising a platform supporting sub-frame, a platform on said sub-frame, stalk guides on said platform, a cutter at the entrance to said platform, said cutter being hinged to said platform, means for moving said cutter on its hinge to adjust the same, means for raising and lowering said platform, entering guide bars coöperative with said platform, feed-in chains coöperative with said guide bars, spring guide bars coöperative with said chains, hinge curved guides, and means for moving said curved guides out of the way when the cutting mechanism is moved rearwardly, means for reversibly mounting said cutting mechanism on said first mentioned frame and means for turning said cutting mechanism to operate when the machine is moving either forwardly or rearwardly.

35. In a cane harvesting machine, a base frame, a cutting mechanism carried by said frame, said cutting mechanism comprising a platform supporting sub-frame, a platform on said sub-frame, stalk guides on said platform, a cutter at the entrance to said platform, said cutter being hinged to said platform, means for moving said cutter on its hinge to adjust the same, means for raising and lowering said platform, entering guide bars coöperative with said platform, feed-in chains coöperative with said guide bars, spring guide bars coöperative with said chains, hinge curved guides, means for moving said curved guides out of the way when the cutting mechanism is moved rearwardly, means for reversibly mounting said cutting mechanism on said first mentioned frame, means for turning said cutting mechanism to operate when the machine is moving either forwardly or rearwardly, said last named means comprising a gear segment on the platform supporting frame, a gear mechanism controlled from the operator's position for actuating said segment, and means for holding said actuating mechanism in its different operative positions.

36. In a cane harvester, a cutting mechanism, an elevator for carrying the stalks from the cutting mechanism, which elevator comprises an upwardly inclined chute and staggered feed chain for advancing the stalks from the cutting mechanism and holding the same normal to the plane of the chute, and guide rods coöperative with said feed chain and chute, stalk turning mechanism, stalk separating mechanism, stalk assorting and head-evening mechanism, individual stalk advancing mechanism, stalk gripping and conveying mechanism, strippers through which the stalks are drawn, stalk topping mechanism, and means for discharging the material through the machine.

37. In a cane harvesting machine, a cutting mechanism, an elevator for carrying the stalks from the cutting mechanism, which elevator comprises an upwardly inclined chute and feed chain for advancing the stalks from the cutting mechanism and holding the same normal to the plane of the chute together with guide rods coöperative with said feed chain and chute, stalk turning mechanism comprising a transverse spiral conveyer and a turn-over platform coöperative therewith, stalk separating mechanism, stalk assorting and head-evening mechanism, individual stalk advancing mechanism, stalk gripping and conveying mechanism, stripper devices through which the stalks are drawn, stalk topping mechanism, and means for discharging the material from the machine.

38. In a cane harvesting machine, a cutting mechanism, an elevator for carrying the stalks from the cutting mechanism, which elevator comprises an upwardly inclined chute and feed chain for advancing the stalks from the cutting mechanism and holding the same to the plane of the chute, together with guide rods coöperative with said feed chains and chute, stalk turning mechanism comprising a transverse spiral conveyer and a turn-over platform coöperative therewith, and guide rods also coöperative therewith, stalk separating mechanism, stalk assorting and head-evening mechanism, individual stalk advancing mechanism, stalk gripping and conveying mechanism, stripper devices through which the stalks are drawn, stalk topping mechanism, and means for discharging the material from the machine.

39. In a cane harvesting machine, a cutting mechanism, an elevator for carrying the stalks from the cutting mechanism, which elevator comprises an upwardly inclined chute and feed chain for advancing the stalks from the cutting mechanism and holding the same normal to the plane of the chute, together with guide rods coöperating therewith, stalk turning mechanism which comprises a transverse spiral conveyer, a turning platform and guide rods coöperating therewith, stalk separating mechanism which comprises an under platform, an infeed spiral conveyer, a main separating compound conical conveyer-spiral, supplemental stalk separating spirals, said under platform having conveyer-spiral receiving pockets, assorting and head-evening mechanism, individual stalk advancing mechanism, stalk gripping and conveying mechanism, stripping devices through which the stalks are drawn, stalk topping mechanism, and means for discharging the material from the machine.

40. In a cane harvesting machine, a cutting mechanism, an elevator for carrying the stalks from the cutting mechanism, which elevator comprises an upwardly inclined chute and feed chain for advancing the stalks from the cutting mechanism and holding the same normal to the plane of the chute, together with guide rods coöperating therewith, stalk turning mechanism which comprises a transverse spiral conveyer, a turning platform and guide rods coöperating therewith, stalk separating mechanism which comprises an under platform, an infeed spiral conveyer, a main separating compound conical conveyer-spiral, supplemental stalk separating spirals, said under platform having conveyer-spiral receiving pockets, a downward conveyer mechanism for carrying the stalks individually downward from the stalk separating mechanism, the said mechanism comprising conveyer chains and guide rods coöperative with said chains, stalk assorting and head-evening mechanism which includes transverse moving fluke-chains, a device for pulling the stalks from the flukes, a conveyer chain for separately conveying the stalks down from said fluke chain, a bottom pan for receiving the stalks from said last named conveyer chain, a horizontal conveyer for carrying the stalks along the bottom pan, individual stalk advancing mechanism, stalk gripping and conveying mechanism, stripping devices through which the stalks are drawn, a base plate over which the stalks are carried by said stalk gripping and conveying mechanism, a topping mechanism, and means for discharging the material from the machine.

41. In a cane harvesting machine, a base frame, wheel supports therefor, a cutting mechanism carried by said frame, an elevator for carrying the stalks from the cutting mechanism, stalk turning mechanism receiving the stalks from the elevator, stalk separating mechanism receiving the stalks from the turning mechanism, a downward conveyer mechanism for carrying the stalks individually from the stalk separating mechanism, stalk assorting and head-evening mechanism to which the stalks are delivered and which comprises transverse fluke chains, rolls for moving the stalks endwise while being carried by the fluke chains, a head board toward which the stalks are moved by said rollers, cross bars between the rollers, shaker devices coöperative with the rollers, said shaker devices comprising arms and eccentric mechanism for shifting said arms, a finger device for pulling the stalks from the flukes, conveyer chains for separately conveying the stalks from said pulling device, a bottom pan on which the stalks are delivered from said pulling device, a conveyer for carrying the stalks along the bottom pan, individual stalk advancing mechanism, stalk gripping and conveying mechanism, strippers through which the stalks are conveyed, a base plate over which the stalks are carried by said stalk gripping and conveying mechanism, topping mechanism, and means for discharging the material from the machine.

42. In a cane harvesting machine, a base frame, wheel supports therefor, a cutting mechanism carried by said frame, an elevator for carrying the stalks from the cutting mechanism, stalk turning mechanism for receiving the stalks from the elevator, stalk separating mechanism, stalk assorting and head-evening mechanism, individual stalk advancing mechanism, stalk gripping and conveying mechanism, said stalk gripping and conveying mechanism comprising a head end gripping and advancing apparatus consisting of an endless diagonally disposed chain with grippers, and operating dogs for said grippers, strippers through which the stalks are drawn, a topping mechanism, and means for discharging the material from the machine.

43. In a cane harvesting machine, a base frame, wheel supports therefor, a cutting mechanism carried by said frame, an elevator for carrying the stalks from the cutting mechanism, stalk turning mechanism for receiving the stalks from the elevator, stalk separating mechanism, stalk assorting and head-evening mechanism, individual stalk advancing mechanism, stalk gripping and conveying mechanism, strippers through which the stalks are drawn lengthwise by said gripping and conveying mechanism, said strippers comprising radial-blade-wheels with fixed stripping disks coöperating therewith and a shearing edge bar also coöperating therewith, topping mechanism, and means for discharging the material from the machine.

44. In a cane harvesting machine, a base frame, wheel supports therefor, a cutting mechanism carried by said frame, an elevator for carrying the stalks from the cutting mechanism, stalk separating mechanism, stalk assorting and head evening mechanism, individual stalk advancing means, stalk gripping and conveying mechanism, stripping devices through which the stalks are drawn, topping mechanism and means for discharging the material from the machine.

45. In a cane harvesting machine, a base frame, wheel supports therefor, a cutting mechanism, an elevator for carrying the stalks from the cutting mechanism, stalk separating mechanism, stalk assorting and head-evening mechanism, means for conveying the stalks from the assorting and head-evening mechanism, and advancing the same individually, stalk gripping and conveying mechanism, strippers through which the stalks are drawn, a topping mechanism, and means for discharging the material from the machine.

46. In a cane harvesting machine, a base frame, wheel supports therefor, a cutting mechanism, an elevator for carrying the stalks from the cutting mechanism, stalk separating mechanism, stalk assorting and head-evening mechanism, means for conveying the stalks from the assorting and head-evening mechanism and advancing the same individually, stalk gripping and conveying mechanism, strippers through which the stalks are drawn, a base plate over which the stalks are carried by said gripping and conveying mechanism, a topping mechanism, and means for discharging the material from the machine.

47. In a cane harvesting machine, a base frame, wheel supports therefor, a cutting mechanism, an elevator for carrying the stalks from the cutting mechanism, stalk separating mechanism, stalk assorting and head-evening mechanism, means for conveying the stalks from the assorting and head-evening mechanism and advancing the same individually, stalk gripping and conveying mechanism, strippers through which the stalks are drawn, a base plate over which the stalks are carried by said gripping and conveying mechanism, a topping mechanism, means for discharging the material from the machine, said topping mechanism comprising a toothed stalk receiving wheel and a rotary topping plate coöperative therewith.

48. In a cane harvesting machine, a base plate, wheel supports therefor, a cutting mechanism carried by said frame, an elevator for carrying the stalks from the cutting mechanism, stalk separating mechanism, stalk assorting and head-evening mechanism which includes a fluke chain, rollers for moving the stalks transversely of the fluke chain, a head board toward which the stalks are moved by the rollers, a device for pulling the stalks loose from the fluke chain, a bottom pan for receiving the stalks from the assorting and head-evening mechanism, a conveyer for carrying the stalks along the bottom pan, a conveyer chain for separately conveying the stalks from the pulling mechanism to the bottom pan, individual stalk advancing mechanism, stalk gripping and conveying mechanism to which the stalks are advanced, stripping mechanism through which the stalks are drawn by the gripping and conveying mechanism, a topping means and means for discharging the material from the machine.

ADDISON BURGESS KNOTTS.